US008103839B2

(12) United States Patent
Takatsuka

(10) Patent No.: US 8,103,839 B2
(45) Date of Patent: Jan. 24, 2012

(54) CONTENT DATA COMMUNICATION SYSTEM, CONTENT DATA RECORDING/REPRODUCING DEVICE, DATA COMMUNICATION METHOD AND PROGRAM

(75) Inventor: Susumu Takatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 1128 days.

(21) Appl. No.: 11/876,466

(22) Filed: Oct. 22, 2007

(65) Prior Publication Data
US 2008/0114953 A1     May 15, 2008

(30) Foreign Application Priority Data

Nov. 13, 2006    (JP) ................................ 2006-306580
May 23, 2007    (JP) ................................ 2007-137156

(51) Int. Cl.
    *G06F 12/00*         (2006.01)
(52) U.S. Cl. ........................................................ 711/154
(58) Field of Classification Search .................... None
See application file for complete search history.

(56) References Cited

U.S. PATENT DOCUMENTS

| 2002/0159304 A1 | 10/2002 | Morita et al. |
| 2005/0165898 A1 | 7/2005 | Morita et al. |
| 2006/0004974 A1* | 1/2006 | Lin et al. ............ 711/164 |

FOREIGN PATENT DOCUMENTS

JP     2001-175624     6/2001

OTHER PUBLICATIONS

"RealJukebox Plus Manual", © 1999 RealNetworks, Inc., p. 1-88.*

* cited by examiner

Primary Examiner — Brian Peugh
(74) Attorney, Agent, or Firm — Oblon, Spivak, McClelland, Maier & Neustadt, L.L.P.

(57) ABSTRACT

A content data communication system comprises a content data recording/reproducing device and an information processing device. The content data recording/reproducing device includes a recording/reproducing device-side connector unit and a recording/reproducing device-side storage unit that stores an application program based upon which transmission of content data from the information processing device to the content data recording/reproducing device is controlled, whereas the information processing device includes a connector unit, a storage unit capable of storing content data and a control unit that reads out the application program stored in the recording/reproducing device-side storage unit and executes control as the content data recording/reproducing device becomes connected to the information processing device and engages the connector unit to transmit the content data stored in a specific data area at the storage unit to the recording/reproducing device-side storage unit based upon the application program having been read out.

23 Claims, 15 Drawing Sheets

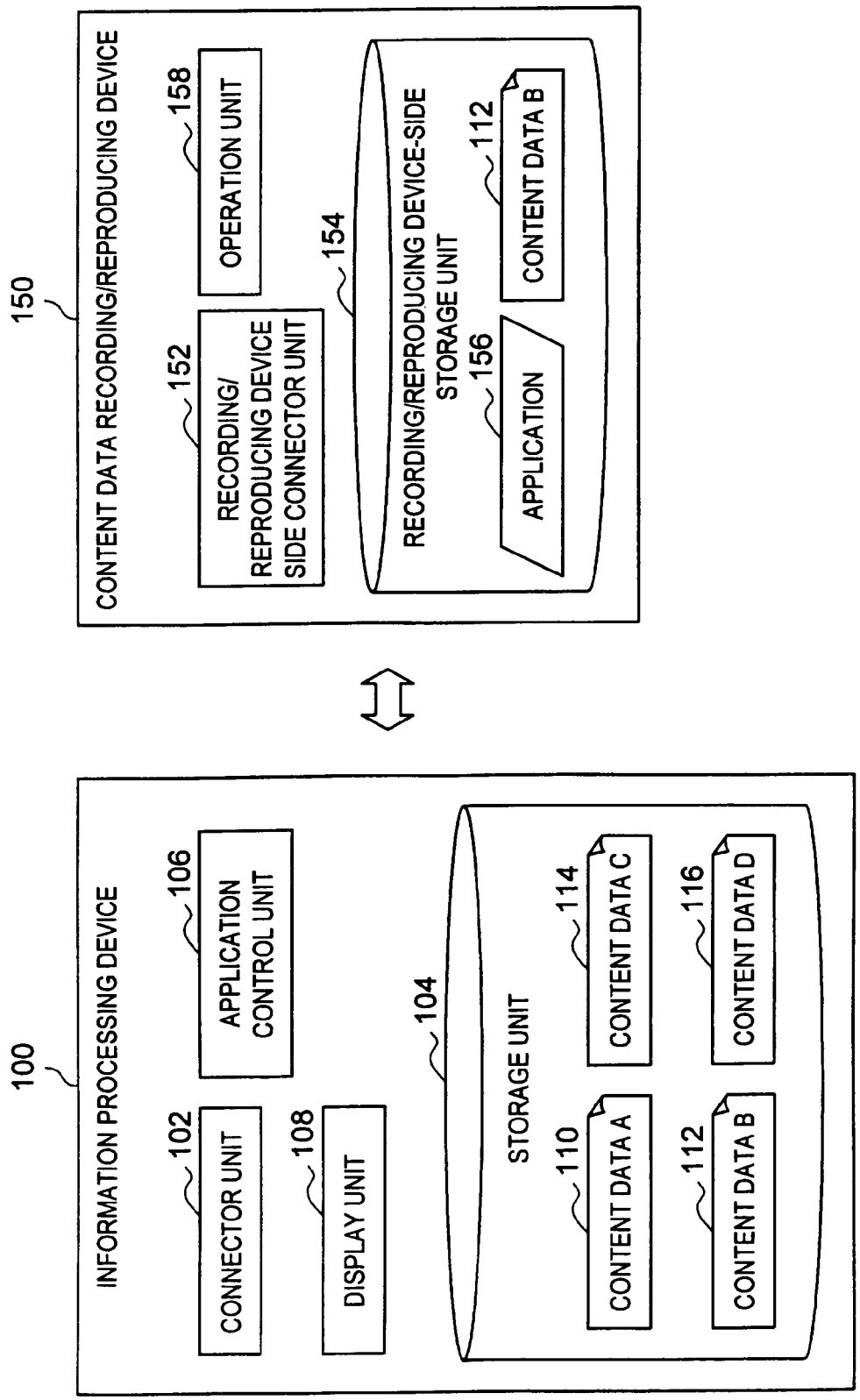

There is no space for sending data.

In
Out

| Song | Artist | Album | Duration | Genre | Last Update | User Rating |
|------|--------|-------|----------|-------|-------------|-------------|
| AAAA | Abc | | 3:50 | Jazz | 200X/12/01 | ★★★★☆ |
| BBBB | Abc | | 4:20 | Jazz | 200X/12/01 | ★★★☆☆ |
| CCCC | Abc | | 1:30 | Jazz | 200X/12/01 | ★★★★☆ |
| DDDD | Def | | 5:10 | Jazz | 200X/11/20 | ★★★☆☆ |
| EEEE | Def | | 2:50 | Jazz | 200X/11/20 | ★★★☆☆ |
| FFFF | Ghi | G Hits | 6:05 | Hip Hop | 200X/07/15 | ★☆☆☆☆ |
| GGGG | Ghi | G Hits | 4:10 | Hip Hop | 200X/07/15 | ★★★☆☆ |
| HHHH | Ghi | G Hits | 0:40 | Hip Hop | 200X/07/15 | ★★☆☆☆ |

120

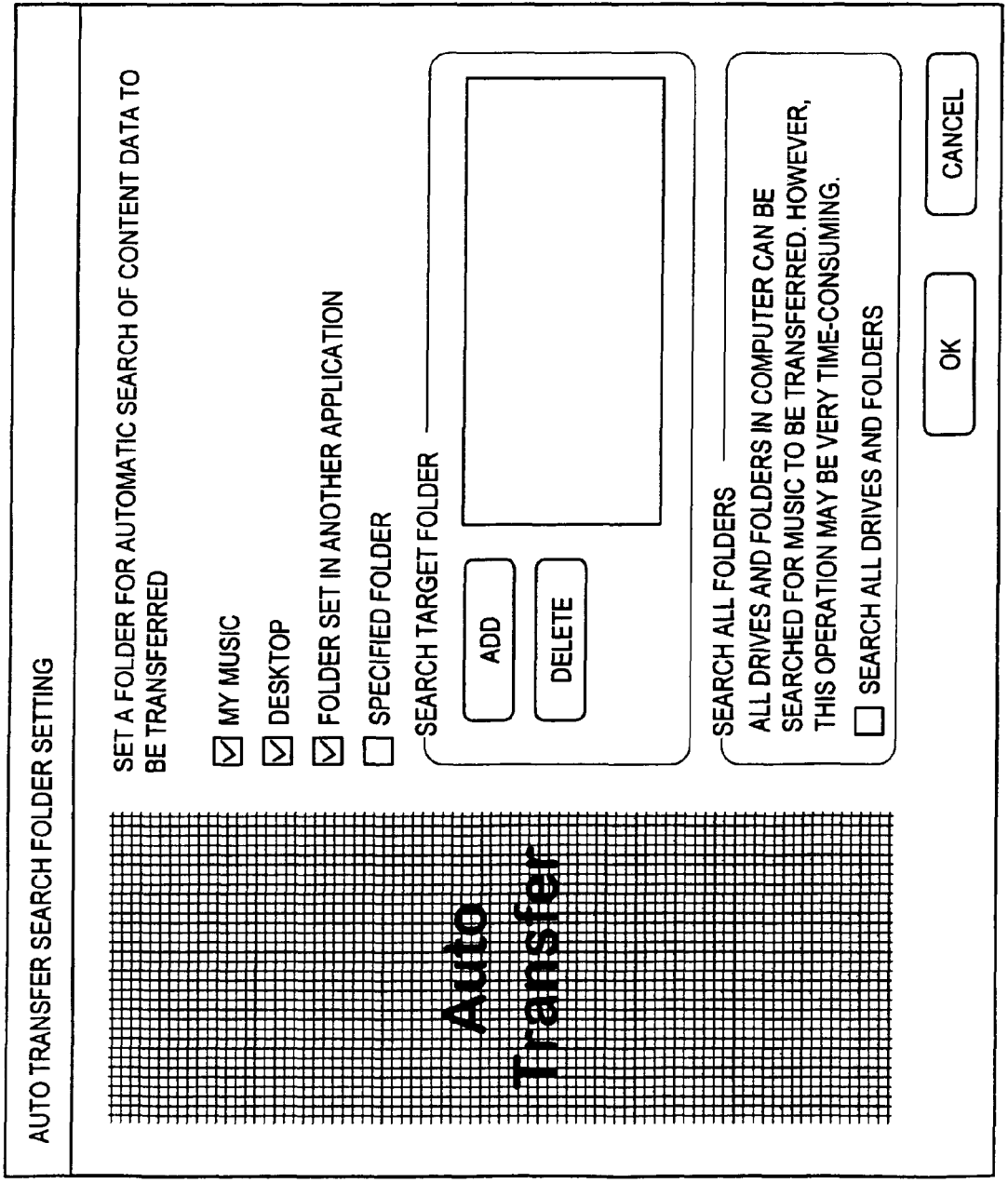

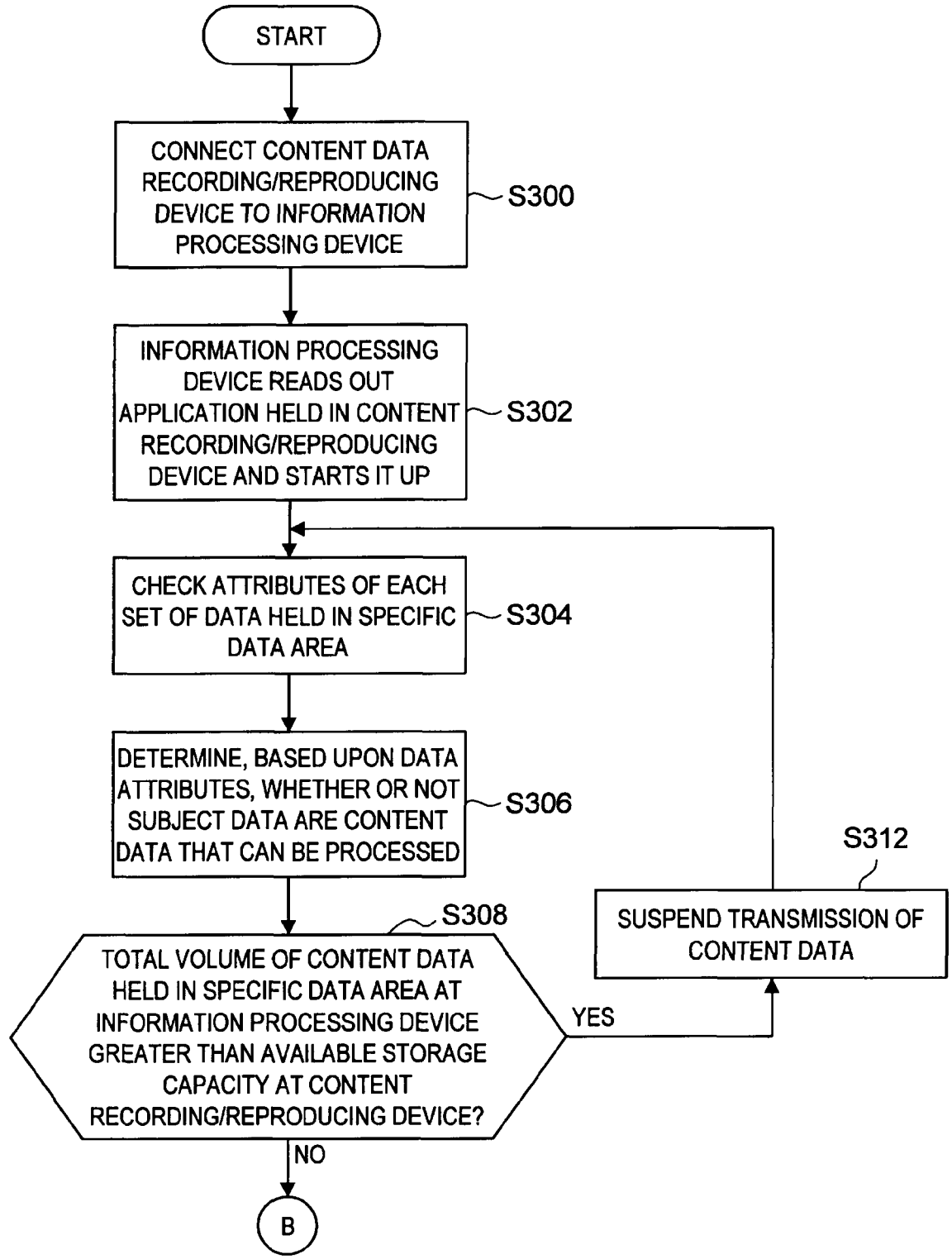

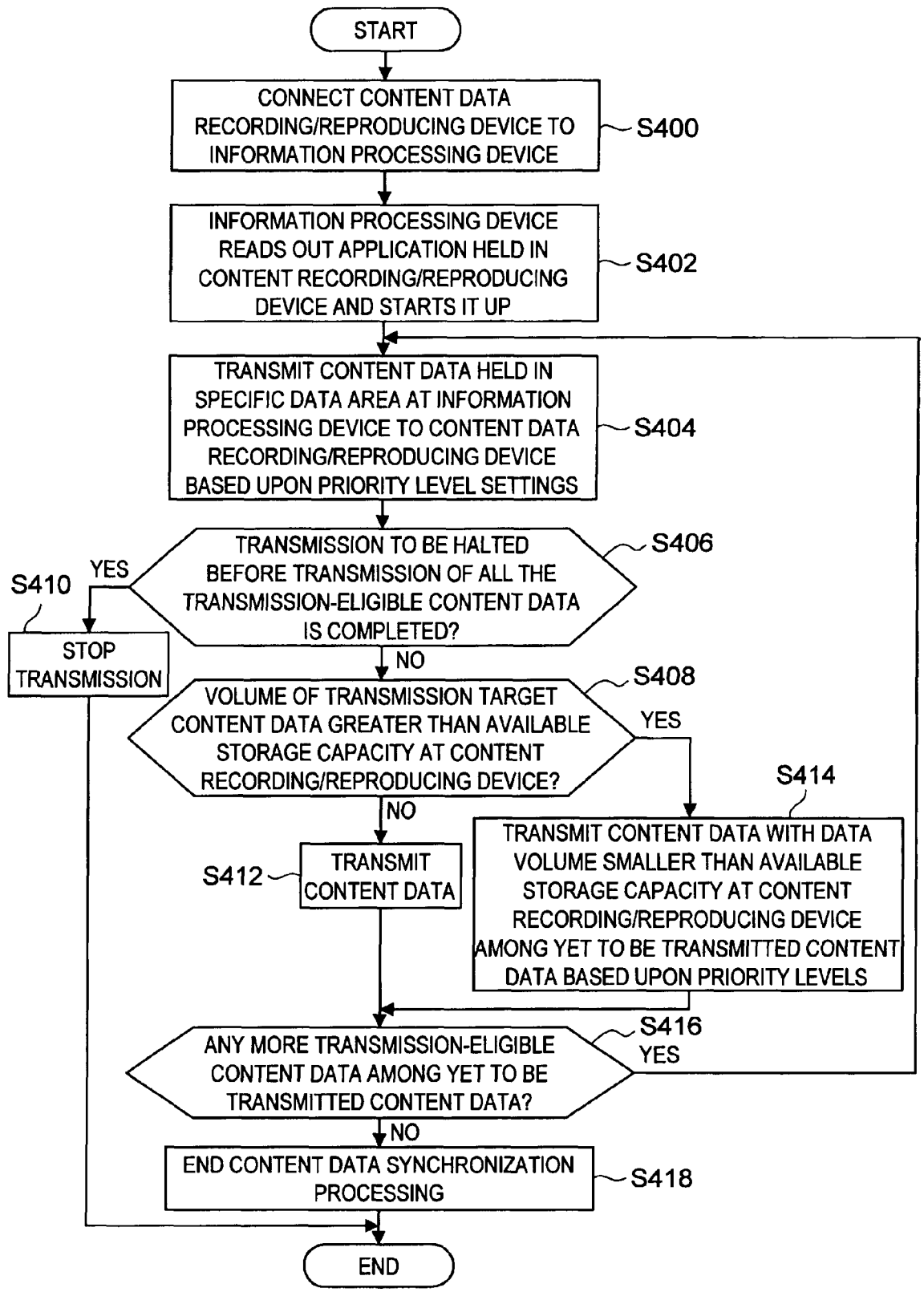

FIG.11A
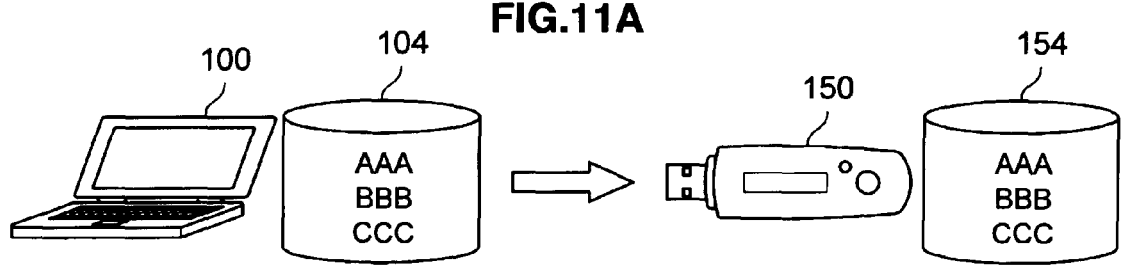
FIG.11B
```
ID
 0d09ejqjk-qwd
Contents-ID    Time
  AAA          200X/10/16/18/15/36
  BBB          200X/10/16/18/15/40
  CCC          200X/10/16/18/15/46
```
FIG.11C
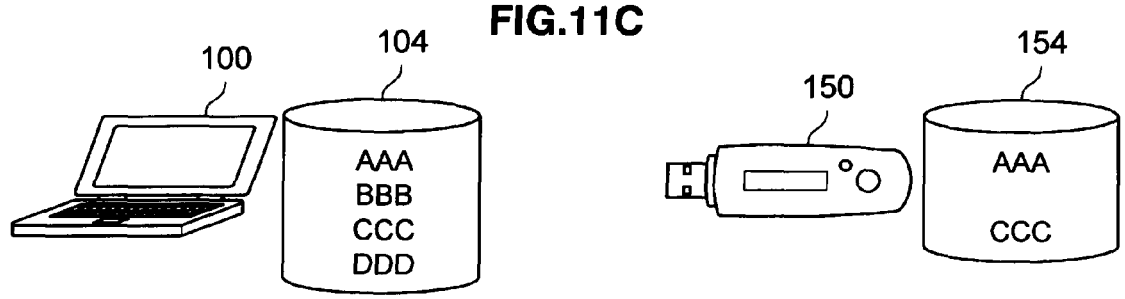
FIG.11D
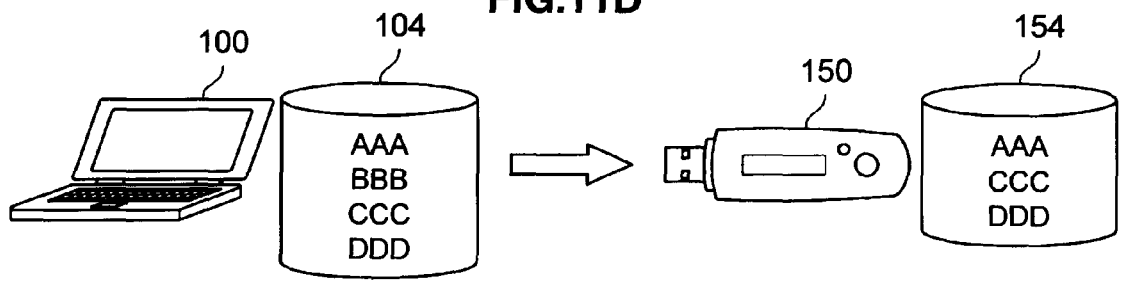
FIG.11E
```
ID
 0d09ejqjk-qwd
Contents-ID    Time
  AAA          200X/10/16/18/15/36
  BBB          200X/10/16/18/15/40
  CCC          200X/10/16/18/15/46
  DDD          200X/10/17/09/30/01
```

US 8,103,839 B2

CONTENT DATA COMMUNICATION SYSTEM, CONTENT DATA RECORDING/REPRODUCING DEVICE, DATA COMMUNICATION METHOD AND PROGRAM

CROSS REFERENCE TO RELATED APPLICATION

The present invention contains related to Japanese Patent Application JP 2006-306580 filed in the Japan Patent Office on Nov. 13, 2006 and Japanese Patent Application JP 2007-137156 filed in the Japan Patent Office on May 23, 2007, the entire contents of which are incorporated herein by reference.

BACKGROUND OF THE INVENTION

1. Field of the Invention

The present invention relates to a content data communication system, a content data recording/reproducing device, a data communication method and a program.

2. Description of the Related Art

Today, content data such as audio files recorded in audio formats including MP3 (Moving Picture Experts Group phase-1 audio layer-3) and ATRAC (Adaptive Transform Acoustic Coding) and dynamic image files recorded in dynamic image formats including WMV (Windows Media Video) and H.264/MPEG-4 AVC (H.264/Moving Picture Experts Group phase-4 advanced video coding) are commonly and widely used. In many cases the user utilizes an information processing device such as a PC (personal computer) to store the content data.

In addition, the use of content data recording/reproducing devices in conjunction with magnetic recording media such as hard disks, nonvolatile memory such as flash memory and the like has become common in recent years. The user may typically utilize content data at the content data recording/reproducing device by synchronizing the information processing device and the content data recording/reproducing device in the handling of the content data.

The content data synchronization between the information processing device and the content data recording/reproducing device is normally achieved with an application program (synchronization application program), which is installed in the information processing device such as a PC. Examples of technologies whereby an application program installed in the information processing device is started up as the content data recording/reproducing device becomes connected include that disclosed in patent reference literature 1.

(Patent Reference Literature 1) Japanese Laid Open Patent Publication No. 2001-175624

SUMMARY OF THE INVENTION

There is a wide range of synchronization application programs used to achieve content data synchronization between information processing devices and content data recording/reproducing devices, including "SonicStage (registered trademark)" the trademark rights held by the applicant of the present invention. This means that the existing technologies whereby the application program installed in the information processing device is started up as the content data recording/reproducing device becomes connected may not assure optimal convenience for the operator of the content data recording/reproducing device (hereafter referred to as the "user"), since the user may have to install a different synchronization application program as needed or the user may need to have a plurality of synchronization application programs installed in the information processing device and selectively use one of the plurality of synchronization application programs in conjunction with the specific content data recording/reproducing device in use.

Accordingly, the present invention, having been completed by addressing the issues discussed above, provides a new and improved content data communication system, a new and improved content data recording/reproducing device, a new and improved data communication method and a new and improved program, which allow content data synchronization to be achieved between an information processing device and a content data recording/reproducing device without the content data recording/reproducing device having to depend upon the information processing device to which it is connected, for the content data synchronization or requiring any operation to be performed in relation to content data synchronization.

According to an embodiment of the present invention, there is provided a content data communication system comprising a content data recording/reproducing device and an information processing device. The content data recording/reproducing device includes a recording/reproducing device-side connector unit that connects with the information processing device and a recording/reproducing device-side storage unit that stores an application program used when controlling transmission of content data from the information processing device to the content data recording/reproducing device, whereas the information processing device includes a connector unit that is connected with the content data recording/reproducing device, a storage unit that stores content data and a control unit that reads out the application program stored in the recording/reproducing device-side storage unit as the content data recording/reproducing device becomes connected with the connector unit and engages the connector unit to transmit the content data stored in a specific data area in the storage unit to the recording/reproducing device-side storage unit based upon the application program having been read out.

The content data recording/reproducing device constituting part of the content data communication system is capable of recording and reproducing content data. In addition, the content data recording/reproducing device includes a recording/reproducing device-side connector unit and a recording/reproducing device-side storage unit in which the application program to be used in the control of the transmission of content data from the information processing device to the content data recording/reproducing device can be stored. The information processing device constituting part of the content data communication system includes, for instance, a connector unit capable of connecting with the content data recording/reproducing device, a storage unit capable of storing content data and a control unit. The control unit in the information processing device is able to read out the application program stored in the recording/reproducing device-side storage unit as the content data recording/reproducing device becomes connected to the connector unit and then engage the connector unit to transmit content data stored in a specific data area in the storage unit to the recording/reproducing device-side storage unit based upon the application program having been read out. This structure allows content data synchronization to be achieved between the information processing device and the content data recording/reproducing device without requiring installation of any application program or requiring any user operation to be performed in relation to content data synchronization.

According to the embodiments of the present invention described above, content data synchronization can be achieved between the information processing device and the content data recording/reproducing device without the content data recording/reproducing device having to rely on the information processing device connected thereto or requiring any operation to be performed in relation to the content data synchronization.

BRIEF DESCRIPTION OF THE DRAWINGS

FIG. 2 is a block diagram of the content data communication system achieved in the first embodiment of the present invention;

FIG. 8 presents an example of information that may be brought up on display to be used to set a specific data area;

FIG. 9A presents a flowchart of a first part of the content data synchronization achieved by adopting a third content data synchronization method in the embodiment of the present invention;

FIG. 10 presents a flowchart of the content data synchronization achieved by adopting a fifth content data synchronization method in the embodiment of the present invention;

FIG. 11 illustrates the method for preventing content data retransmission adopted in the embodiment of the present invention;

DETAILED DESCRIPTION OF THE PREFERRED EMBODIMENTS

Figure 1A:
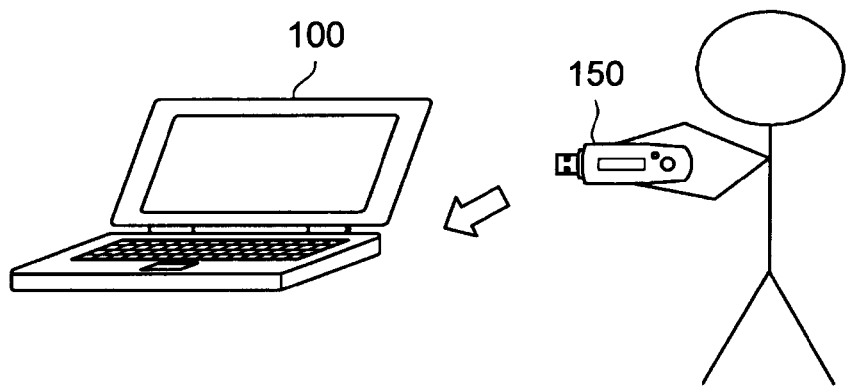
FIG. 1 schematically illustrates the content data communication system achieved in a first embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

First Embodiment

FIG. 1 schematically illustrates the content data communication system achieved in the first embodiment of the present invention. In reference to FIG. 1, the content data synchronization achieved in the content data medication system in the first embodiment of the present invention is first outlined. It is to be noted that while the content data described in the following explanation are audio files in the MP3 format, the ATRAC format or the like, content data other than audio files may be used in the embodiment of the present invention, and dynamic image files in, for instance, the WMV format or the MPEG format may be handled, instead.

Figure 1B:
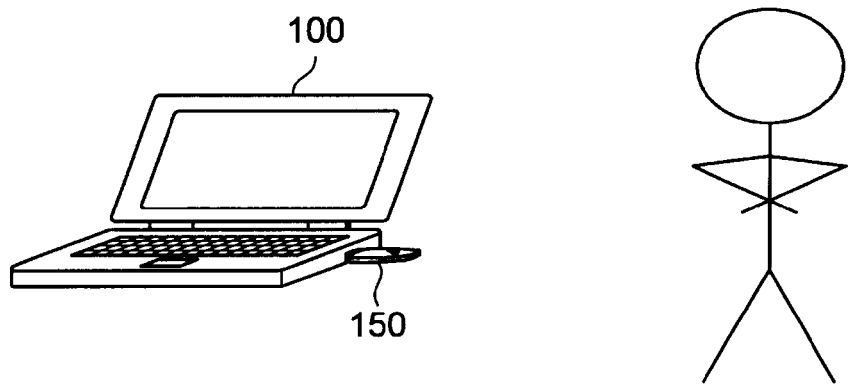
Figure 1C:
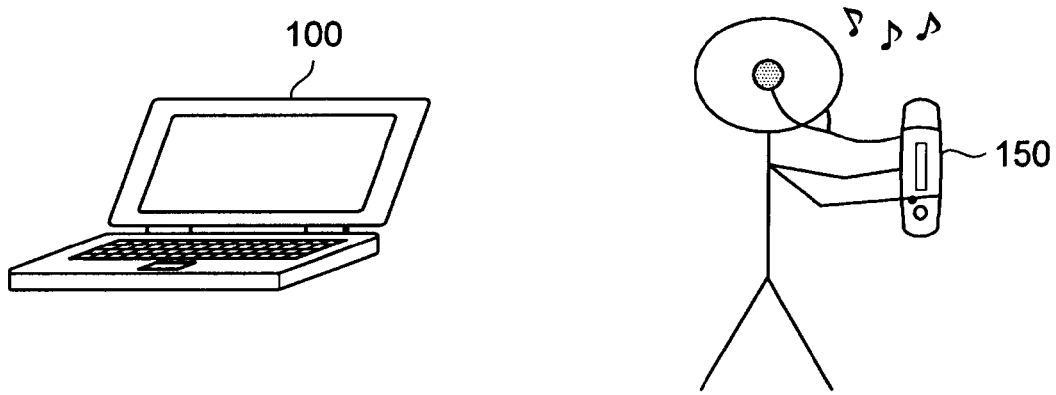

As the user connects a content data recording/reproducing device 150 to an information processing device 100 (see FIG. 1(a)), content data transmission from the information processing device 100 to the content data recording/reproducing device 150 (i.e., content data synchronization) automatically starts. At this time, the user does not need to perform any operation in relation to the content data transmission (see FIG. 1(b)). As the content data transmission from the information processing device 100 to the content data recording/reproducing device 150 is completed, the user disengages the content data recording/reproducing device 150 from the information processing device 100 and is able to enjoy the content data having been transmitted from the information processing device 100 to the content data recording/reproducing device 150, at the content data recording/reproducing device 150 (see FIG. 1(c)).

As shown in FIG. 1, the content data transmission automatically starts as the user connects the content data recording/reproducing device 150 to the information processing device 100 in the content data communication system achieved in the first embodiment of the present invention. Thus, the content data synchronization between the information processing device 100 and the content data recording/reproducing device 150 can be achieved without requiring any user operation in relation to the content data synchronization. The following is a more detailed explanation of the content data communication system achieved in the first embodiment of the present invention.

FIG. 2 is a block diagram of the content data communication system achieved in the first embodiment of the present invention. As shown in FIG. 2, the content data communication system in the first embodiment of the present invention includes the information processing device 100 and the content data recording/reproducing device 150.

The information processing device 100 includes, at least, a connector unit 102, a storage unit 104, an application control unit 106 and a display unit 108. The information processing device 100 may further include a control unit (not shown) that is constituted with a CPU (central processing unit) (not shown), a storage device such as a register, a RAM (random access memory), a ROM (read only memory), a nonvolatile memory and the like (not shown) and executes overall control of the information processing device 100. It is to be noted that the application control unit 106 and the control unit (not shown) may be embodied in an integrated unit constituted with a CPU and the like.

The connector unit 102 may be a terminal such as a USB (universal serial bus) terminal or an IEEE 1394-standard terminal, which physically connects with the content data recording/reproducing device 150, or it may be a unit to wirelessly connect with the content data recording/reproducing device 150 by using a WUSB (wireless universal serial bus), an IEEE 802.11 or the like.

The storage unit 104 is used as a data holder of the information processing device 100, in which content data, e.g., content data A110~content data D116, can be stored. While the storage unit 104 may be constituted with a magnetic recording medium such as a hard disk or magnetic tape, a nonvolatile memory such as a flash memory, an MRAM (magnetoresistive random access memory), an Fe RAM (ferroelectric random access memory) or a PRAM (phase change random access memory) or a magneto-optical disk, it is not strictly necessary that the storage unit 104 be constituted with any of these.

The application control unit 106 reads out an application program stored in the content data recording/reproducing device 150 to be detailed later. It then executes and controls the application program having been read out. The application control unit 106 reads out the application program. It then executes and controls the application program so as to transmit content data stored in the storage unit 104 to the content data recording/reproducing device 150 via the connector unit 102 based upon the application program. At the display unit 108, display messages related to the functions of the application program controlled by the application control unit 106, such as a progress indicator indicating the status of content data transmission in progress and a list of the content data stored in the storage unit 104, a basic operation window (the desktop screen) brought up on display immediately after the OS (operating system) of the information processing device 100 is started up and the like are displayed.

The content data recording/reproducing device 150 includes, at least, a recording/reproducing device-side connector unit 152, a recording/reproducing device-side storage unit 154 and an operation unit 158. The content data recording/reproducing device 150 may further include a recording/reproducing device-side control unit (not shown), which is constituted with a CPU (not shown), a data holder (not shown) such as a register, a RAM, a ROM, a nonvolatile memory or the like and controls the overall operations of the content data recording/reproducing device 150 and a display unit (not shown).

The recording/reproducing device-side connector unit 152, through which the connection with the information processing device 100 is achieved, has a shape and functions corresponding to those of the connector unit 102 at the information processing device 100. For instance, if the connector unit 102 at the information processing device 100 is a USB terminal, the recording/reproducing device-side connector unit 152, too, should be a USB terminal, whereas if the connector unit 102 at the information processing device 100 is a terminal in compliance with the IEEE 1394 standard, the recording/reproducing device-side connector unit 152, too, should be a terminal in compliance with the IEEE 1394 standard. In either case, the connector unit 102 at the information processing device 100 and the recording/reproducing device-side connector unit 152 are physically connected with each other. If, on the other hand, the connector unit 102 at the information processing device 100 has a function of carrying out WUSB communication, the recording/reproducing device-side connector unit 152, too, should have a function of carrying out WUSB communication and, in this case, the connector unit 102 at the information processing device 100 and the recording/reproducing device-side connector unit 152 are wirelessly connected with each other.

The recording/reproducing device-side storage unit 154 is a data holder of the content data recording/reproducing device 150, in which an application program related to content data synchronization to be achieved between the information processing device 100 and the content data recording/reproducing device 150 (hereafter referred to as the "synchronization application program") 156 and content data such as content data B112 transmitted from the information processing device 100 are stored. While the recording/reproducing device-side storage unit 154 may be a magnetic recording medium such as a hard disk, a nonvolatile memory such as a flash memory or a magneto-optical disk, the present invention is not limited to these examples. In addition, the synchronization application program itself may contain processing such as transmission processing related to the content data synchronization or it may control transmission processing contained in another application program.

The operation unit 158 is operated to reproduce, stop reproduction of, or delete content data in the content data recording/reproducing device 150. While the operation unit 158 may be constituted with buttons, direction keys or a rotary selector such as a jog dial, or it may be constituted as a combination of these members, the present invention is not limited to these examples. Content data can be deleted at the content data recording/reproducing device 150 itself as long as the content data recording/reproducing device 150 is equipped with the operation unit 158, and in such a case, the available storage capacity at the recording/reproducing device-side storage unit 154 for content data storage can be increased through a user operation.

In the content data communication system achieved in the first embodiment of the present invention adopting the structure described above, the application control unit 106 reads out the synchronization application program 156 stored in the recording/reproducing device-side storage unit 154 as the information processing device 100 and the content data recording/reproducing device 150 become connected with each other. Then, the application control unit 106 executes and controls the application program having been read out, thereby executing automatic transmission of content data from the information processing device 100 to the content data recording/reproducing device 150.

Next, specific methods that may be adopted when transmitting content data from the information processing device 100 to the content data recording/reproducing device 150, i.e., content data synchronization methods that may be adopted to achieve content data synchronization between the information processing device 100 and the content data recording/reproducing device 150, are explained.

(First Synchronization Method)

Figure 3:
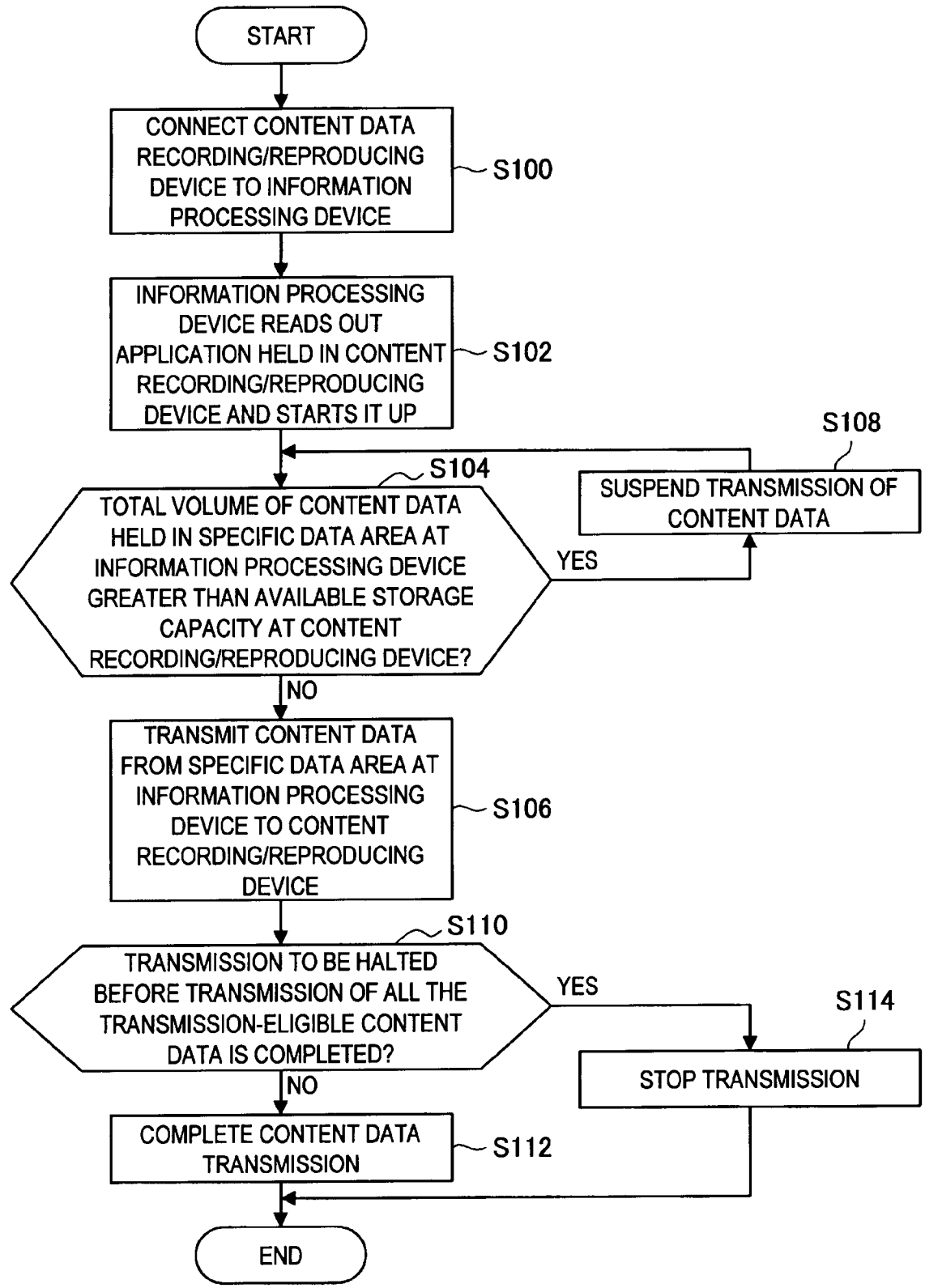
FIG. 3 presents a flowchart of the content data synchronization achieved by adopting a first content data synchronization method in the embodiment of the present invention.
Figure 4:
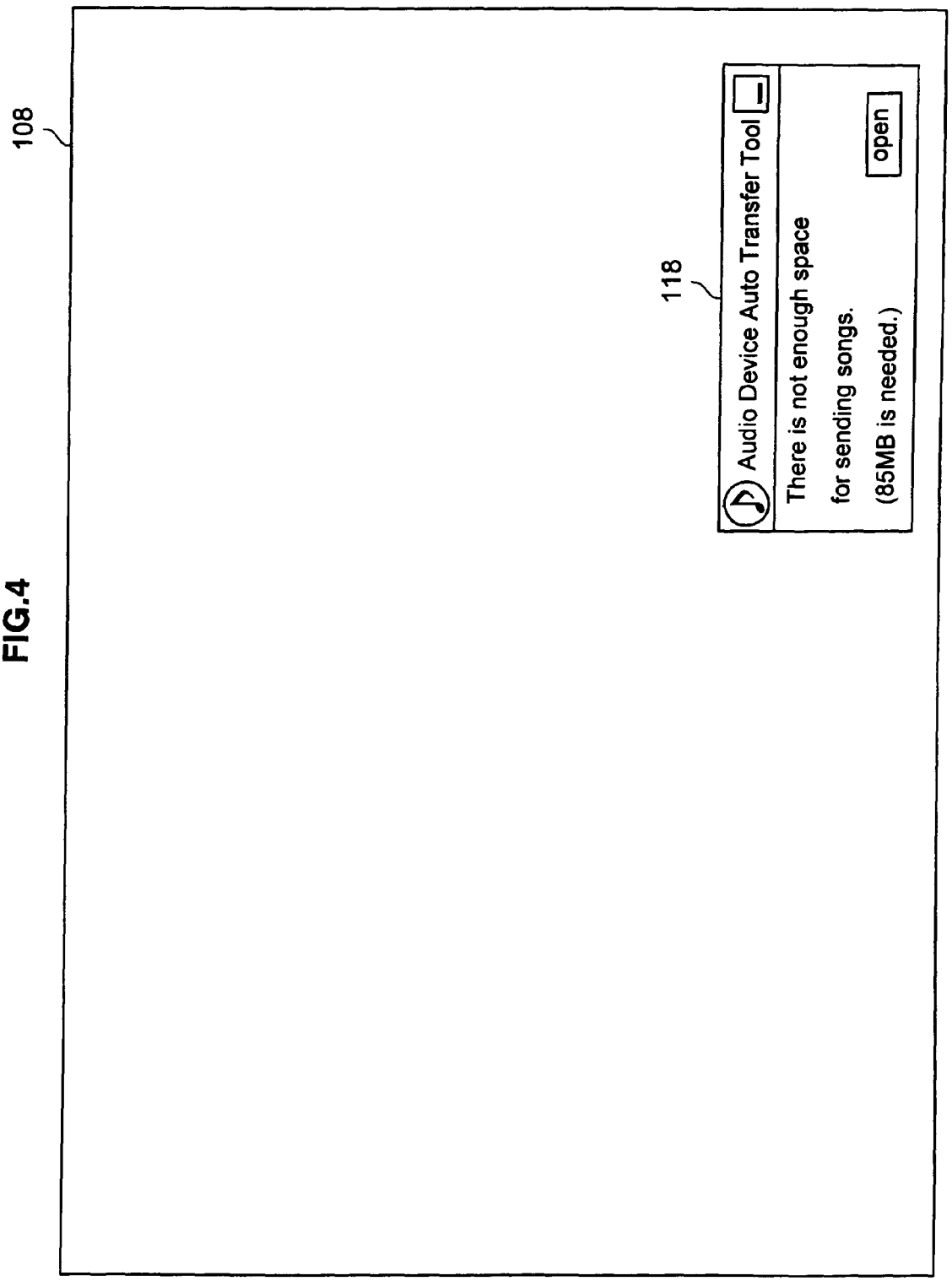
FIG. 4 presents an example of a warning display that may be brought up on display in relation to content data transmission in the embodiment of the present invention.
Figure 5:
FIG. 5 presents an example of a list display indicating the content data stored in the information processing device, which may be brought up on display in relation to content data transmission in the embodiment of the present invention.
Figure 6:
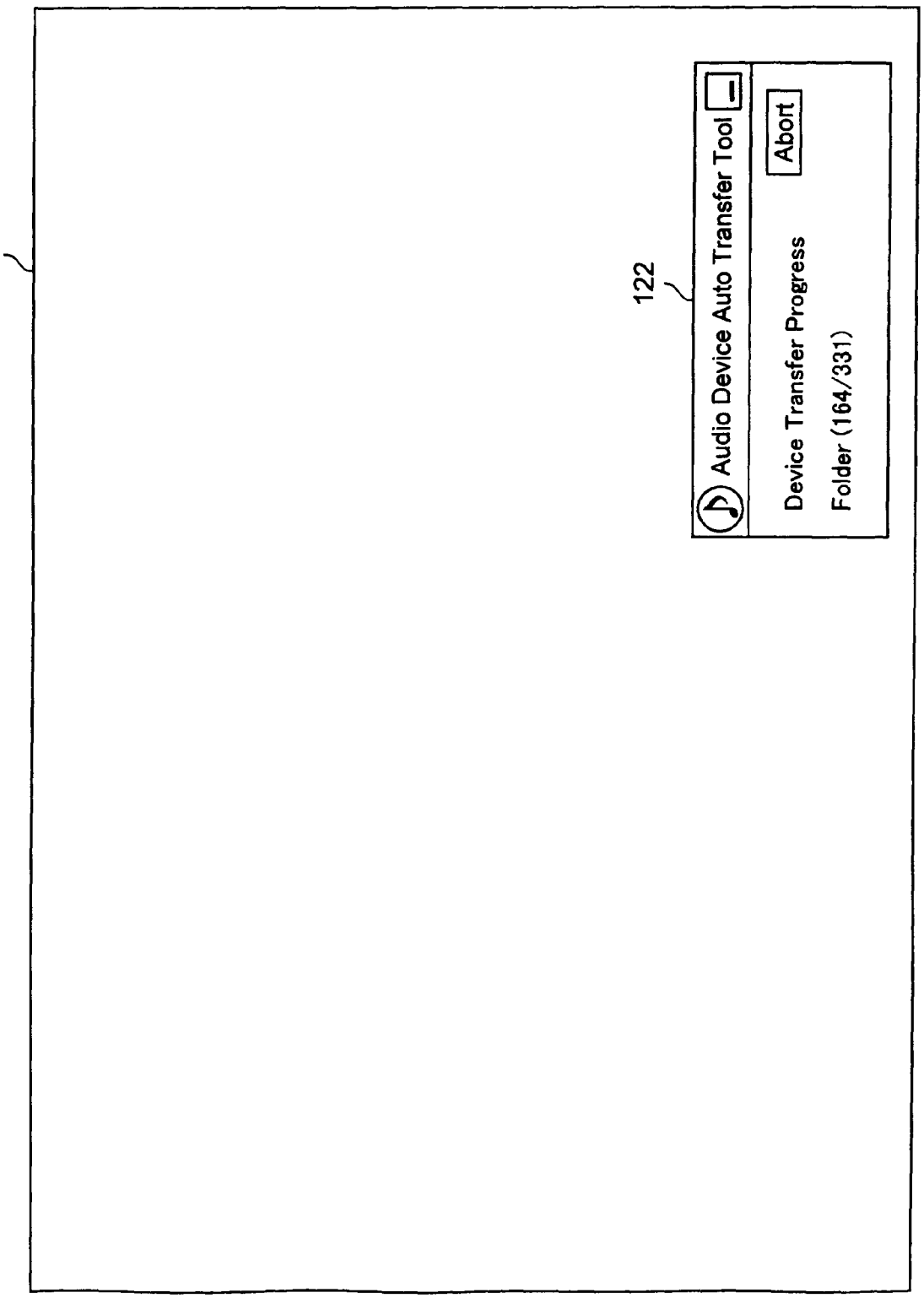
FIG. 6 presents an example of a progress indication frame that may be brought up on display in relation to content data transmission in an embodiment of the present invention.

FIG. 3 presents a flowchart of the processing executed by adopting the first content data synchronization method achieved in the embodiment of the present invention. In addition, FIGS. 4 through 6 show various types of information brought up on display by the application program in the embodiment of the present invention. In more specific terms, FIG. 4 presents an example of a warning display that may be brought up in relation to the content data transmission, and FIG. 5 presents an example of a content data list display indicating the sets of content data stored in the information processing device 100, which may be brought up in relation to the content data transmission. FIG. 6 presents an example of a progress indication frame that may be brought up on display in relation to the content data transmission.

The following is an explanation of the first content data synchronization method achieved in the embodiment of the present invention, given in reference to FIG. 3.

The content data recording/reproducing device 150 and the information processing device 100 become connected to each other (S100). The content data recording/reproducing device and the information processing device may become connected to each other in this step through a physical connection such as a USB connection, or they may become wirelessly connected through, for instance, a WUSB connection.

After the content data recording/reproducing device 150 and the information processing device 100 become connected with each other in step S100, the information processing device 100 reads out the synchronization application program stored in the content data recording/reproducing device 150 and starts up the synchronization application program read out from the content data recording/reproducing device 150 (S102). The synchronization application program stored in the content data recording/reproducing device 150 may be started up by the information processing device 100 through, for instance, an AutoRun function or the like, which eliminates the need for the user to install the synchronization application program in the information processing device 100. It is to be noted that the processing in the individual steps described below in reference to FIG. 3 is executed based upon the synchronization application program, which is read out from the content data recording/reproducing device 150, started up and executed by the information processing device 100.

The synchronization application program having been started up by the information processing device 100 in step S102 then makes a decision as to whether or not the entire volume of content data stored in a specific data area in the information processing device 100 is greater than the available storage capacity at the content data recording/reproducing device 150 (S104). The specific data area in the information processing device 100 may be a folder (directory) specified in advance by the synchronization application program or it may be set freely by the user. A structure that allows the user to set the specific data area in the information processing device 100 is to be described in detail later (second synchronization method). In addition, it will be obvious that there may be a plurality of specific data areas set in the information processing device 100 in the form of, for instance, folders pre-assigned by the synchronization application program, folders set by the user or the like.

While the total volume of the content data stored in the specific data area in the information processing device 100 may refer to the volume of all the content data stored in the specific data area, the term "total volume" may be defined otherwise. For instance, it will be obvious that the content data accounted for in the term "total volume" may exclude content data under DRM (digital rights management) restricting transmission of certain content data from the information processing apparatus 100 to the content data recording/reproducing device 150.

If it is decided in step S104 that the total volume of the content data stored in the specific data area in the information processing device 100 is greater than the available storage capacity at the content data recording/reproducing device 150, content data transmission is not executed (S108). The processing executed in step S108 prevents the synchronization application program from ending in an error due to, for instance, insufficient storage capacity at the content data recording/reproducing device 150, where the content data are received and recorded, relative to the total volume of content data being transmitted.

At this point, a warning message 118 such as that shown in FIG. 4 may be brought up on display at the display unit 108 of the information processing device 100. The warning message 118 shown in FIG. 4 indicates that the total volume of the content data stored in the specific data area in the information processing device 100 is greater than the available storage capacity at the content data recording/reproducing device 150 by 85 MB. In addition, the warning message 118 is brought up to take up a right corner of the display unit 108 so as to provide the information by ensuring that the warning display affects the current user operation only to the absolute minimum extent. It is to be noted that while the warning message 118 shown in FIG. 4 includes warning information indicating that the total volume of the content data stored in the specific data area in the information processing device 100 is greater than the available storage capacity at the content data recording/reproducing device 150, the total volume of the content data stored in the specific data area in the information processing device 100 and a storage capacity representing the difference between the total volume of the content data stored in the specific data area in the information processing device 100 and the available storage capacity at the content data recording/reproducing device 150, the warning display may include the warning information alone, instead. It also will be obvious that the contents, the layout, the display position and the like of the information provided in the warning are not limited to those in the warning message 118 shown in FIG. 4.

In addition, the warning message 118 may include an "open" button operated to bring up a list of the content data stored in the specific data area in the information processing device 100. A list display screen 120 such as that shown in FIG. 5, for instance, can be brought up on display by touching the "open" button.

The list display screen 120 in FIG. 5 provides a list of the content data stored in the specific data area in the information processing device 100, together with information indicating the title of the tune (song), the name of the artist, the title of the album containing the content data, the length (duration) of the tune, the genre, the last update, the rating (user rating) indicating how often the content data have been reproduced and the like in correspondence to each set of content data, so as to enable the user to selectively delete content data that are not to be transmitted from the information processing device 100 to the content data recording/reproducing device 150. It is to be noted that the information provided in the content data list display may be derived from meta-information set for the individual sets of content data.

It is to be noted that the term "delete" used in the description of the embodiment of the present invention may refer to physically deleting content data or it may refer to clearing the corresponding display in the list display screen 120 (i.e., the content data themselves are not physically deleted). In either case, the content data specified for deletion in the embodiment of the present invention are not transmitted to the content data recording/reproducing device 150. It will be obvious that if content data specified for deletion are simply cleared in the display brought up in the list display screen 120, the "deleted" content data can be reinstated in a transmission-ready state by, for instance, reconnecting the content data recording/reproducing device 150 to the information processing device 100.

In addition, indicators "In" and "Out" are displayed in the list display screen 120 so as to facilitate selective deletion of content data to be withheld from transmission from the information processing device 100 to the content data recording/reproducing device 150. For instance, the "In" indicator may indicate the volume of data that must be deleted to make room for content data transmission and the "Out" indicator may indicate the total volume of content data selected for deletion from the content data list so as to clearly indicate which content data may be deleted to enable transmission (i.e., how some content data stored in the specific data area at the information processing device 100 may be deleted so as to assure a greater available storage capacity at the content data recording/reproducing device 150 relative to the total volume of the content data in the specific data area). While three sets of content data "FFFF", "GGGG" and "HHHH" have been selected in the example presented in FIG. 5, the "In" indicator bar is longer than the "Out" indicator bar, indicating that more content data must be deleted. It is to be noted that while the two indicators, the "In" indicator and the "Out" indicator, are displayed in the list display screen 120 to facilitate selective deletion of content data to be suspended from transmission from the information processing device 100 to the content data recording/reproducing device 150, the present invention is not limited to this example and a single indicator may be used as a multipurpose indicator to fulfill a specific function in correspondence to a given setting selection to facilitate selective deletion of content data. It will also be obvious that instead of the list display screen 120, a list display screen that includes an indicator indicating the total volume of the content data to be transmitted from the information processing device 100 to the content data recording/reproducing device 150 may be brought up on display so as to facilitate selection of the content data to be transmitted from the information processing device 100 to the content data recording/reproducing device 150.

While specific content data may be selectively deleted in response to an instruction entered via an operation input unit (not shown) such as a keyboard or a mouse included in the information processing device 100 or via a delete button displayed in the list display screen 120, the present invention is not limited to these examples as long as the selected content data can be deleted.

It is to be noted that a list display screen other than the list display screen 120 in FIG. 5 may be used in the embodiment of the present invention. For instance, a list display screen carrying information indicating the location where each set of content data is stored (i.e., information indicating the specific data area where the content data are stored) may be used in the embodiment of the present invention.

To resume the explanation in reference to FIG. 3, as content data stored in the specific data area at the information processing device 100 are selectively deleted through the operation described above, the decision-making in step S104 is executed again. Through the decision-making executed again in step S104, the content data synchronization between the information processing device 100 and the content data recording/reproducing device 150 can be resumed. It is to be noted that the list display screen 120 may further include a StartTransport button and a touch of the StartTransport button may be used as a trigger for re-executing the decision-making in step S104.

If it is decided in step S104 that the total volume of the content data stored in the specific data area in the information processing device 100 is equal to or less than the available storage capacity at the content data recording/reproducing device 150, the content data stored in the specific data area in the information processing device 100 are transmitted to the content data recording/reproducing device 150 (S106).

At this time, a progress indication frame 122 may be brought up on display at the display unit 108 in the information processing device 100, as shown in FIG. 6. The progress indication frame 122 may indicate that a specific data area in the information processing device 100 stores 331 sets of transmittable content data and that 164 sets of content data among them have been transmitted. Accordingly, the user is able to check the progress status of the content data transmission by referencing the progress indication frame 122. In addition, the progress indication frame 122 should occupy, for instance, an area at the right corner of the display unit 108 to provide the information by ensuring that the current operation being performed by the user is minimally affected by the display. It is to be noted that while the progress indication frame is brought up on display at the display unit 108 of the information processing device 100 in the explanation provided above, the present invention is not limited to this example and it may be implemented without displaying a progress indication frame (without displaying information indicating the progress status of the content data transmission). If no progress indication frame is provided, a sound may be output or a completion indicator screen may be brought up on display upon the completion of the content data transmission to alert the user that the content data transmission is complete.

Also, when transmitting content data from the specific data area in the information processing device 100 to the content data recording/reproducing device 150, content data which are not protected through digital copyright management, among the sets of content data stored in the specific data area can be designated as the transmission target based upon the synchronization application program. In this case, the synchronization application program achieves content data synchronization between the information processing device 100 and the content data recording/reproducing device 150 while assuring content data copyright protection.

In addition, the synchronization application program may convert the character code used in the filenames and the like of content data to be transmitted to a character code that is display-compatible with the content data recording/reproducing device 150, e.g., converting from Unicode to Shift_JIS, when transmitting content data in the specific data area at the information processing device 100 to the content data recording/reproducing device 150. Consequently, display of garbage characters at the content data recording/reproducing device 150 can be prevented based upon the synchronization application program.

If the content data recording/reproducing device 150 stores content data with a filename identical to the filename of content data to be transmitted thereto, the synchronization application program, engaged in the transmission of content data in the specific data area at the information processing device 100 to the content data recording/reproducing device 150, may automatically change (re-name) the filename of the content data to be transmitted. As the synchronization application program automatically changes the filename, the content data transmission processing executed to transmit the content data in the specific data area at the information processing device 100 to the content data recording/reproducing device 150 is not interrupted due to filename duplication. Furthermore, since the filename is automatically changed by the synchronization application program, an inadvertent overwrite of existing content data can be prevented.

Furthermore, when the content data in the specific data area at the information processing device 100 are transmitted to the content data recording/reproducing device 150, the synchronization application program may create a playlist of the transmitted content data bearing, for instance, the transmission date as its playlist title, and provide the content data recording/reproducing device 150 with the playlist. The playlist bearing the transmission date as its playlist title stored in the content data recording/reproducing device 150 facilitates a content data search in the content data recording/reproducing device 150.

As the content data transmission from the information processing device 100 to the content data recording/reproducing device 150 starts in step S106, the synchronization application program makes a decision as to whether or not to halt the content data transmission before all the transmittable content data stored in the specific data area at the information processing device 100 are transmitted (S110). The decision as to whether or not to halt the transmission may be made in step S110 by deciding, for instance, whether or not an Abort button in the progress indication frame 122 in FIG. 6 has been touched.

If it is decided in step S110 that the content data transmission is to be halted, the content data transmission is stopped, thereby halting the content data transmission (S114). It is to be noted that while the content data synchronization processing executed to achieve synchronization between the information processing device 100 and the content data recording/reproducing device 150 ends as the content data transmission is stopped in step S114 in the example presented in FIG. 3, the present invention is not limited to this example and the content data transmission having been stopped may be allowed to resume instead. The content data transmission may be resumed in step S114 in response to, for instance, a touch of a StartTransport button in the progress indication frame such as that shown in FIG. 6. Alternatively, the content data having already been transmitted may be marked in history information related to transmitted content data and, based upon the history information, the transmitted content data may be withheld from transmission when the information processing device 100 and the content data recording/reproducing device 150 become connected with each other again. The method adopted to prevent retransmission of the transmitted content data based upon the history information is to be described in detail later.

If it is decided in step S110 that the content data transmission is not to be halted, the synchronization application program transmits the transmittable content data stored in the specific data area at the information processing device 100 and once the transmission of all the transmittable content data is completed, it ends the content data synchronization processing for the information processing device 100 and the content data recording/reproducing device 150 (S112). As the content data synchronization processing ends, the information processing device 100 releases the synchronization application program having been read out from the content data recording/reproducing device 150. The "completion of the content data transmission" in this context may include the completion of processing executed to record the transmitted content data into the recording/reproducing device-side storage unit 154 at the content data recording/reproducing device 150.

As described above, the information processing device adopting the first content data synchronization method achieved in the embodiment of the present invention, reads out the synchronization application program stored in the content data recording/reproducing device and starts up the synchronization application program thus read out as the content data recording/reproducing device and the information processing device become connected with each other. In other words, the method does not require the user to install the synchronization application program in the information processing device. As a result, the content data synchronization can be achieved between the information processing device and the content data recording/reproducing device without having to depend upon the information processing device, to which the content data recording/reproducing device is connected.

In addition, the synchronization application program started up by the information processing device automatically transmits content data from the information processing device to the content data recording/reproducing device and thus, the user of the content data recording/reproducing device is able to synchronize the content data between the information processing device and the content data recording/reproducing device without having to perform any operation related to the content data transmission.

(Second Synchronization Method)

Figure 7A:
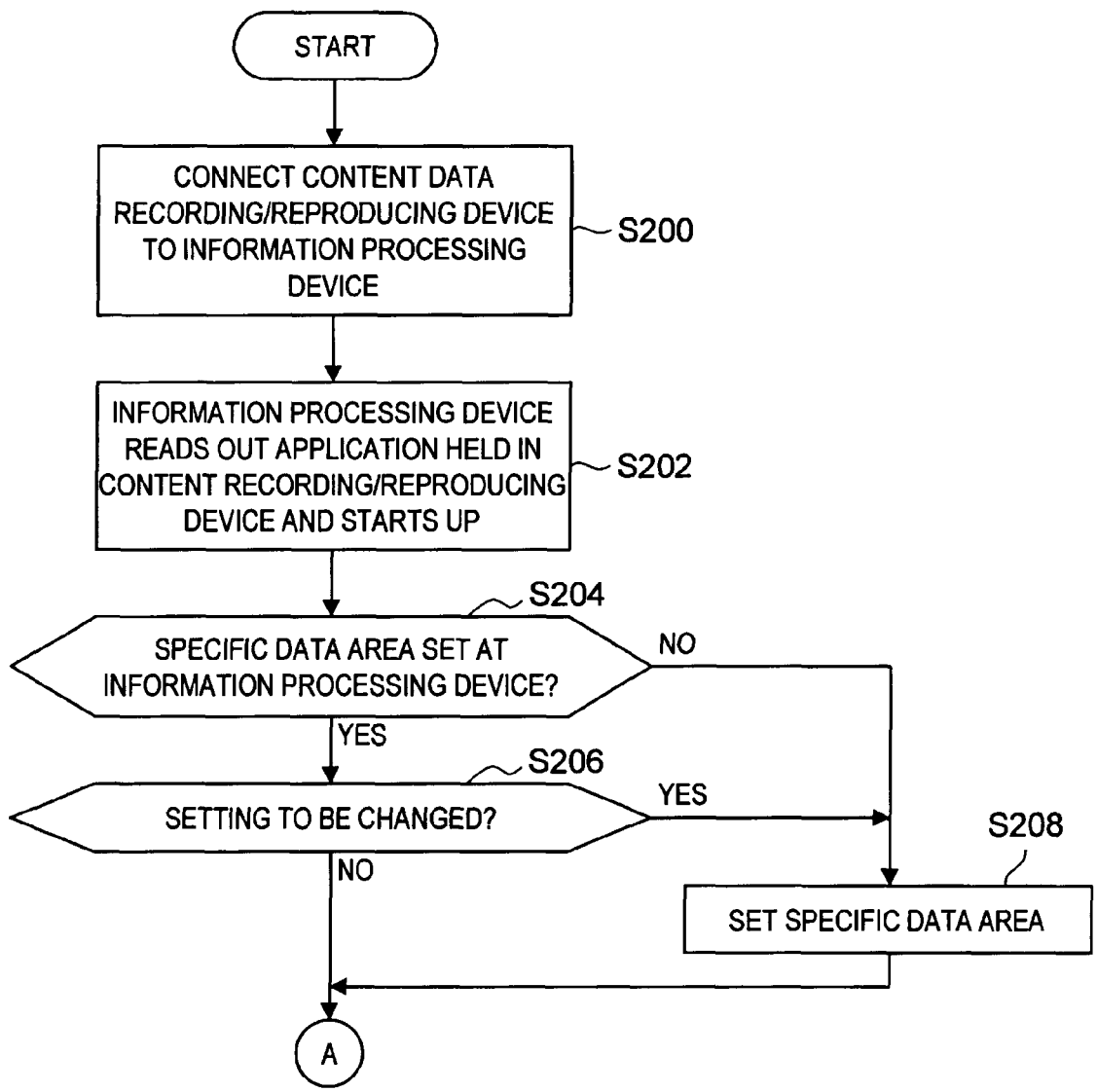
FIG. 7A presents a flowchart of a first part of the content data synchronization achieved by adopting a second content data synchronization method in the embodiment of the present invention.
Figure 7B:
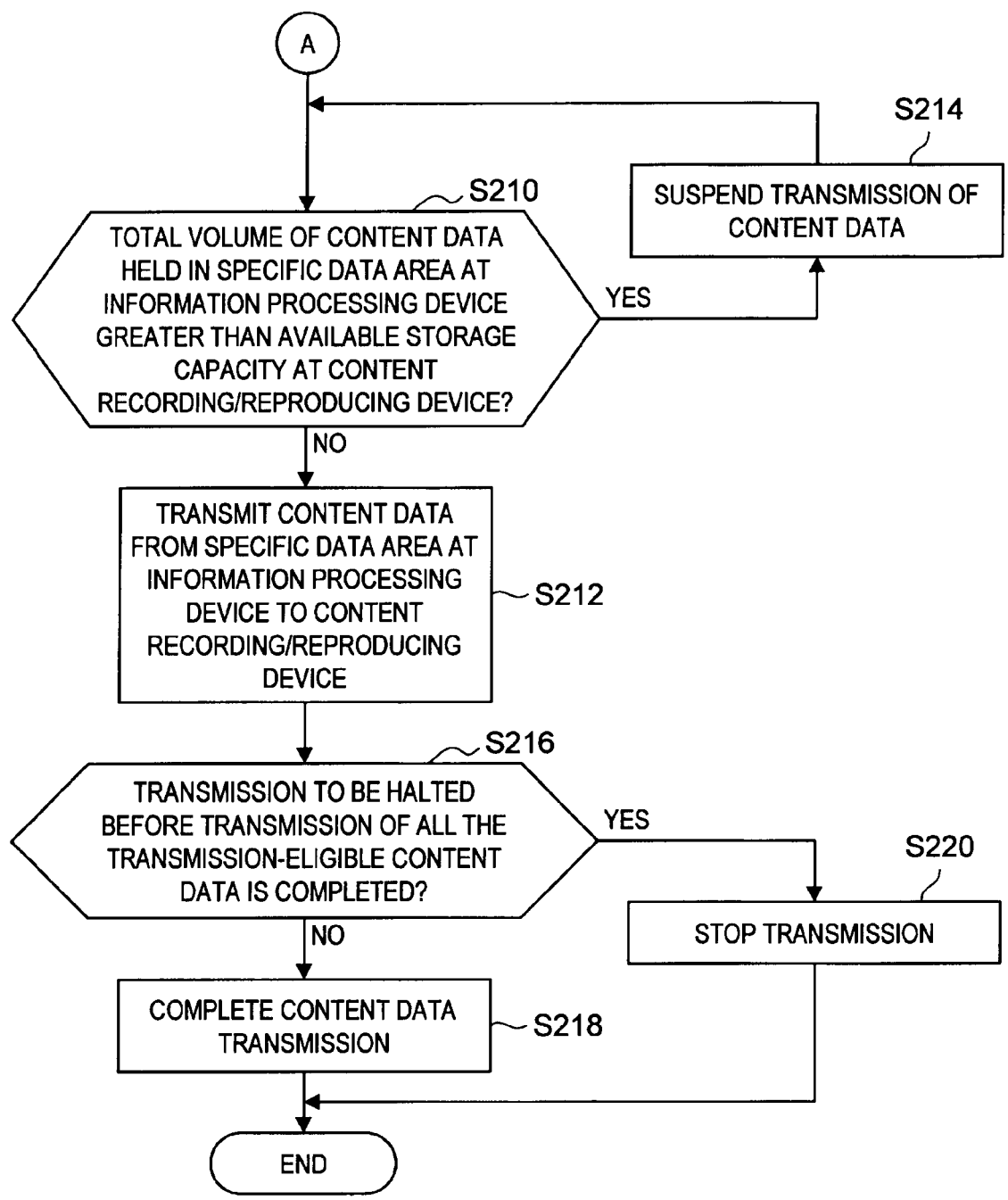
FIG. 7B presents a flowchart of the second part of the content data synchronization achieved by adopting the second content data synchronization method in the embodiment of the present invention.

Next, the second synchronization method achieved in the embodiment of the present invention, which allows the user to select a specific data area in the information processing device 100, is explained. FIGS. 7A and 7B present a flowchart of the processing executed by adopting the second content data synchronization method achieved in the embodiment of the present invention.

As shown in FIG. 7A, the content data recording/reproducing device 150 and the information processing device 100 become connected with each other (S200) as in the first synchronization method.

After the content data recording/reproducing device 150 and the information processing device 100 become connected with each other in step S200, the information processing device 100 reads out the synchronization application program stored in the content data recording/reproducing device 150 and starts up the synchronization application program thus read out (S202). The information processing device 100 starts up the synchronization application program stored in the content data recording/reproducing device 150 through, for instance, its AutoRun function, and thus, the need for the user to install the synchronization application program in the information processing device 100 is eliminated as in the first synchronization method. It is to be noted that the steps described below in reference to FIGS. 7A and 7B are executed by the synchronization application program read out from the content data recording/reproducing device 150 and are started up and executed by the information processing device 100.

In step S202, the synchronization application program having been started up by the information processing device 100 makes a decision as to whether or not a data area (hereafter to be referred to as a "specific data area") has been designated as a content data transmission source at the information processing device 100 (S204). The decision-making in step S204 may be executed by making a decision as to whether or not setting information containing specific data area information is stored in the information processing device 100. Such setting information may be stored in the information processing device 100 as an independent file (setting file) or it may be stored in a various-setting database in the OS or within a various-setting storing file at the information processing device 100. With the setting information described above stored in the information processing device 100, the synchronization application program is able to manage information with regard to the specific data area, i.e., the content data transmission source, in correspondence to each information processing device that may become connected to the content data recording/reproducing device 150.

If it is decided in step S204 that no specific data area has been set, the synchronization application program brings up on display information to be used to set a specific data area to enable specific data area setting (S208: new setting).

FIG. 8 presents an example of information that may be brought up on display to be used to set a specific data area. By bringing up on display the specific data area setting information (setting screen) such as that shown in FIG. 8, the synchronization application program prompts the user to designate a specific data area. For instance, the setting screen shown in FIG. 8 allows any of the following three types of locations (i)~(iii) as the specific data area.
(i) predefined locations such as "my music", "desktop" and "folders set in another application", e.g., SonicStage (registered trademark)" the trademark rights to which are stored by the applicant of the present invention
(ii) "specified folders" that can be specified by the user according to their location
(iii) "all drives and folders" in the information processing device 100

The data areas (i~iii) described above may each be ranked with a specific priority. For instance, if (iii) is selected while (i) or (ii) is already set, the synchronization application program may give priority to the (iii) setting over the (i) or (ii) setting. It will be obvious that the synchronization application program is capable of deactivating the (i) or (ii) setting and disabling any user operation to select the (i) or (ii) setting (e.g., disabling operation of the checkboxes in FIG. 8) after (iii) is selected.

In addition, if, for instance, (ii) is selected, the synchronization application program may set a particular area specified by the user as the highest priority content data transmission source. In such a case, the synchronization application program may indicate the content data stored in the specific area specified by the user at the top of the list in the list display screen 120 shown in FIG. 5. With the content data stored in the specific area having been specified by the user indicated at the top of the list in the list display screen 120 in FIG. 5, the content data in a specific area (e.g., a specific area set by selecting (i)) other than the user-specified area are indicated at lower positions relative to the user-specified area in the list. Such a display helps the user selectively delete content data to be withheld from the transmission from the information processing device 100 to the content data recording/reproducing device 150 with greater ease.

In step S208, the synchronization application program brings up on display a setting screen such as that shown in FIG. 8 so as to enable the user to select any data area as the specific data area. It will be obvious that the information to be used for the specific data area setting in the embodiment of the present invention is not limited to that shown in FIG. 8.

To continue with the explanation of the second synchronization method in reference to FIG. 7A, if it is decided in step S204 that a specific data area has been set, the synchronization application program makes a decision as to whether or not the specific data area setting is to be changed (S206). The decision-making with regard to the setting change may be executed in step S206 by making a decision as to whether or not a change instruction for adjusting the setting information, generated by the application control unit 106, has been detected. The application control unit 106 may generate the change instruction in response to a touch of a setting button (not shown) operated to call up a setting screen, which may be included in the progress indication frame 122 in FIG. 6. The application control unit 106 may also generate a change instruction in response to a specific input at a device-side operation unit (not shown) in the information processing device 100. However, the present invention is not limited to these examples. The device-side operation unit (not shown) in the information processing device 100 may be, for instance, an operation input device such as a keyboard, a mouse or a touch screen.

If it is decided in step S206 that the specific data area setting is to be adjusted, the synchronization application program brings up on display the specific data area setting information to allow a new specific area to be set (S208: setting adjustment). Since the synchronization application program allows a different data area to be set as the specific data area, more flexible content data synchronization is achieved between, for instance, the information processing device 100 and the content data recording/reproducing device 150.

Next, in reference to FIG. 7B, the processing executed after deciding in step S206 that the specific data area setting is not to be adjusted or after setting a specific data area in step S208 is explained.

The synchronization application program makes a decision as to whether or not the total volume of the content data stored in the specific data area at the information processing device 100 is greater than the available storage capacity at the content data recording/reproducing device 150 (S210). At this time, the synchronization application program is able to determine the specific data area in the information processing device 100 based upon the setting information stored in the information processing device 100 or the setting information having been adjusted in step S208.

If it is decided in step S210 that the total volume of the content data stored in the specific data area at the information processing device 100 is equal to or less than the available storage capacity at the content data recording/reproducing device 150, the synchronization application program transmits the content data stored in the specific data area at the information processing device 100 to the content data recording/reproducing device 150 as in the first synchronization method (S212).

If, on the other hand, it is decided in step S210 that the total volume of the content data stored in the specific data area at the information processing device 100 is greater than the available storage capacity at the content data recording/reproducing device 150, the synchronization application program suspends content data transmission as in the first synchronization method (S214).

As the content data transmission from the information processing device 100 to the content data recording/reproducing device 150 starts in step S212, the synchronization application program makes a decision as to whether or not to halt the content data transmission before all the transmittable content data stored in the specific data area at the information processing device 100 are transmitted (S216), as in the first synchronization method.

If it is decided in step S216 that the content data transmission is to be halted, the content data transmission is stopped, thereby halting the content data transmission (S220), as in the first synchronization method.

If it is decided in step S216 that the content data transmission is not to be halted, the synchronization application program transmits the transmittable content data stored in the specific data area at the information processing device 100, as in the first synchronization method. Once the transmission of all the transmittable content data is completed, the synchronization application program ends the content data synchronization processing for the information processing device 100 and the content data recording/reproducing device 150 (S218). As the content data synchronization processing ends, the information processing device releases the synchronization application program having been read out from the content data recording/reproducing device 150, as in the first synchronization method.

As described above, the information processing device adopting the second content data synchronization method achieved in the embodiment of the present invention, reads out the synchronization application program stored in the content data recording/reproducing device and starts up the synchronization application program thus read out as the content data recording/reproducing device and the information processing device become connected with each other, as in the first synchronization method. In other words, the method does not require the user to install the synchronization application program in the information processing device. As a result, the content data synchronization can be achieved between the information processing device and the content data recording/reproducing device without having to depend upon the information processing device, to which the content data recording/reproducing device is connected.

In addition, the synchronization application program started up by the information processing device automatically transmits content data from the information processing device to the content data recording/reproducing device and thus, the user of the content data recording/reproducing device is able to synchronize the content data between the information processing device and the content data recording/reproducing device without having to perform any operation related to the content data transmission, as in the first synchronization method.

Furthermore, the second content data synchronization method achieved in the embodiment of the present invention allows the user to set any area as the specific data area to be used as the content data transmission source. In other words, the user, who is able to control the content data to be transmitted to the content data recording/reproducing device by setting a desired data area, can selectively transmit only desired content data, among various sets of content data stored in the information processing device, to the content data recording/reproducing device.

It is to be noted that while step S206 is executed after step S204 in the processing shown in FIG. 7A and FIG. 7B, the second content data synchronization method in the embodiment of the present invention may be adopted in processing other than that shown in FIGS. 7A and 7B. For instance, the processing in step S206 may be executed with any timing after step S212, in which the content data transmission starts.

(Third Synchronization Method)

There may be some restrictions with regard to the type of content data that can be reproduced at the content data recording/reproducing device (e.g., the content data recording/reproducing device may be capable of reproducing content data assuming a compatible file format or codec determined in advance). However, the information processing device may store data prepared in various file formats or data assuming various codec algorithms and the content data recording/reproducing device may not be capable of reproducing some of the data stored in the information processing device. Accordingly, an explanation is now given on the third synchronization method achieved in the embodiment of the present invention to assure content data synchronization by converting any data in a file format or codec not compatible with the content data recording/reproducing device to a format compatible with the content data recording/reproducing device.

Figure 9B:
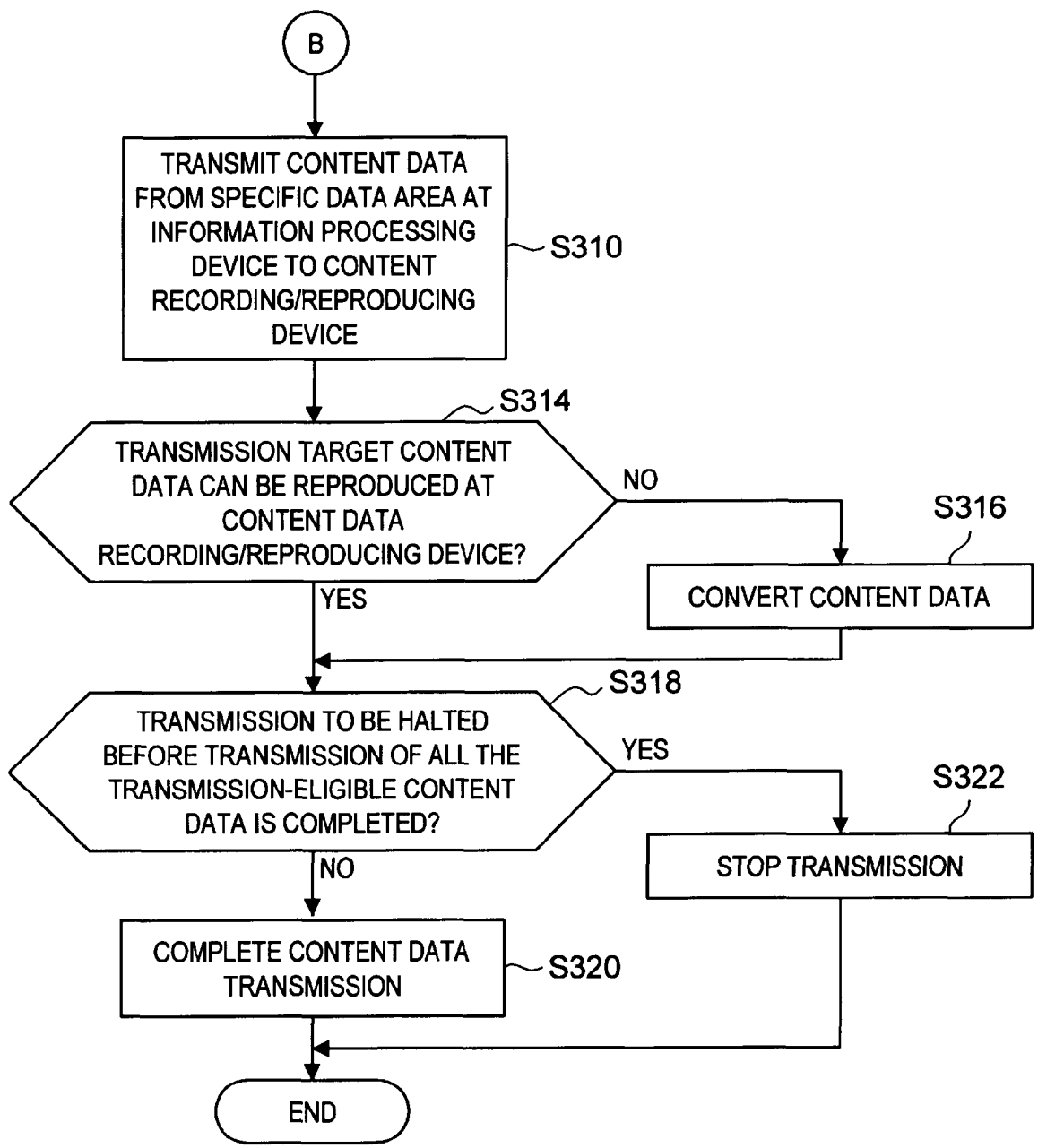
FIG. 9B presents a flowchart of the second part of the content data synchronization achieved by adopting the third content data synchronization method in the embodiment of the present invention.

FIGS. 9A and 9B present a flowchart of the processing executed by adopting the third content data synchronization method achieved in the embodiment of the present invention.

As shown in FIG. 9A, the content data recording/reproducing device 150 and the information processing device 100 become connected with each other (S300) as in the first synchronization method.

After the content data recording/reproducing device 150 and the information processing device 100 become connected with each other in step S300, the information processing device 100 reads out the synchronization application program stored in the content data recording/reproducing device 150 and starts up the synchronization application program thus read out (S302). The information processing device 100 starts up the synchronization application program stored in the content data recording/reproducing device 150 through, for instance, its AutoRun function, and thus, the need for the user to install the synchronization application program in the information processing device 100 is eliminated as in the first synchronization method. It is to be noted that the steps described below in reference to FIGS. 9A and 9B are executed by the synchronization application program read out from the content data recording/reproducing device 150 and are started up and executed by the information processing device 100.

In step S302, the synchronization application program having been started up by the information processing device 100 checks the attributes of the individual sets of data stored in the specific data area (S304). The specific data area in the information processing device 100 may be a folder set in advance in the synchronization application program or it may be a data area set freely by the user. In addition, while the attributes of the various sets of data may be checked in step S304 based upon, for instance, meta-information set in file extensions or in the files themselves, the attribute check may also be executed any other way. The term "meta-information" in this context refers to information related to the data to which it is appended.

The results of the attribute check executed on the individual sets of data in step S304 can be used in the processing in step S306 (to be detailed later).

Based upon the data attributes having been checked in step S304, a decision is made for each set of data as to whether or not the data are content data that can be processed (S306). The criteria used in the decision-making in step S306 may include (A)~(I) below. In step S306, any set of data meeting the criteria (A)~(I) below may be judged to be content data. It will be obvious that criteria other than (A)~(I) below may be adopted in the embodiment of the present invention.

(A) codec
 audio: "WAV", "ATRAC", "MP3", "WMA"
 still image: "JPEG", "GIF", "BMP"
 dynamic image: "H•264/AVC baseline", "MPEG-1", "WMV"
(B) sampling rate
(C) bit rate
(D) stream control method
 CBR (constant bit rate)
 VBR (variable bit rate)
(E) H.264/AVC level
 "level 1b", "level 1.1", "level 2"
(F) video max bit rate
 "up to 768 Kbps"
(G) video max frames
 "up to 30 fps"
(H) image size
 "up to 320×240"
(I) character code
 "Unicode", "Shift_JIS", "JIS×0201"

The results of the decision made for each set of data in step S306 may be stored in, for instance, a data holder in the information processing device 100. While the data holder used to store the decision-making results obtained in step S306 may be, for instance, the storage unit 104, the decision-making results may be stored in another device. For instance, the decision-making results obtained in step S306 may be stored at another storage unit constituted with a volatile memory such as an SDRAM (synchronous dynamic random access memory) or SRAM (static random access memory), a nonvolatile memory such as a flash memory or a magnetic recording medium such as a hard disk.

After the decision is made in step S306 for each set of data as to whether or not the data are content data that can be processed, the synchronization application program makes a further decision as to whether or not the total volume of the content data stored in the specific data area at the information processing device 100 is greater than the available storage capacity at the content data recording/reproducing device 150 (S308). At this time, the synchronization application program is able to determine the total volume of the content data based upon the volumes of the individual sets of data having been determined in step S306 to be content data.

If it is decided in step S308 that the total volume of the content data stored in the specific data area at the information processing device 100 is greater than the available storage capacity at the content data recording/reproducing device 150, the synchronization application program suspends content data transmission as in the first synchronization method (S312).

Next, in reference to FIG. 9B, an explanation is given on the processing executed after deciding in step S308 that the total volume of the content data stored in the specific data area at the information processing device 100 is equal to or less than the available storage capacity at the content data recording/reproducing device 150.

If it is decided in step S308 that the total volume of the content data stored in the specific data area at the information processing device 100 is equal to or less than the available storage capacity at the content data recording/reproducing device 150, the synchronization application program transmits the content data stored in the specific data area at the information processing device 100 to the content data recording/reproducing device 150 as in the first synchronization method (S310).

After the transmission starts in step S310, a decision is made for each set of content data set for transmission as to whether or not the content data recording/reproducing device 150 is capable of reproducing the particular content data (S314). The decision-making may be executed in step S314 based upon the attributes of the individual sets of data having been checked in step S304. In addition, the synchronization application program may contain information to be used as the criteria when making the decision as to whether or not each set of content data set for transmission can be reproduced at the content data recording/reproducing device 150.

If it is decided in step S314 that a set of content data to be transmitted cannot be reproduced at the content data recording/reproducing device 150, the synchronization application program converts the transmission target content data to data that can be reproduced at the content data recording/reproducing device 150. If, for instance, the content data recording/reproducing device 150 is capable of reproducing data in the "MP3" format and the "ATRAC" format only and is not capable of reproducing data in the "WAV" format, the synchronization application program converts any data in the "WAV" format to data in either the "MP3" format or the "ATRAC" format. It is to be noted that while an explanation is given above on an example in which the content data format is converted, the data conversion executed in the embodiment of the present invention is not limited to this example. The synchronization application program is capable of executing diverse types of conversion processing including image size conversion and bit rate conversion. In addition, while an explanation is given above on an example in which the content data are audio data, it will be obvious that the content data may be other types of data.

After each set of data having been determined to be content data in step S306 undergoes decision-making in step S314 as to whether or not the data can be reproduced at the content data recording/reproducing device 150, the synchronization application program then converts any data having been determined to be content data in step S306 that cannot be reproduced at the content data recording/reproducing device 150, to reproducible data then transmits the data in the reproducible format to the content data recording/reproducing device 150.

In addition, the synchronization application program may bring up on display a conversion setting screen (not shown) in which the post-conversion data format can be set/adjusted so as to allow the user to set/adjust the type of data to result from the conversion.

As the content data transmission from the information processing device 100 to the content data recording/reproducing device 150 starts in step S310 (to be more exact, as the processing in steps S314 and S316 is executed in preparation for the actual transmission), the synchronization application program makes a decision as to whether or not to halt the content data transmission before all the transmittable content data stored in the specific data area at the information processing device 100 are transmitted (S318), as in the first synchronization method.

If it is decided in step S318 that the content data transmission is to be halted, the content data transmission is stopped thereby halting the content data transmission (S322), as in the first synchronization method.

If it is decided in step S318 that the content data transmission is not to be halted, the synchronization application program transmits the transmittable content data stored in the specific data area at the information processing device 100, as in the first synchronization method. Once the transmission of all the transmittable content data is completed, it ends the content data synchronization processing for the information processing device 100 and the content data recording/reproducing device 150 (S320). As the content data synchronization processing ends, the information processing device 100 releases the synchronization application program having been read out from the content data recording/reproducing device 150, as in the first synchronization method.

As described above, the information processing device adopting the third content data synchronization method achieved in the embodiment of the present invention, reads out the synchronization application program stored in the content data recording/reproducing device and starts up the synchronization application program thus read out as the content data recording/reproducing device and the information processing device become connected with each other, as in the first synchronization method. In other words, the method does not require the user to install the synchronization application program in the information processing device. As a result, the content data synchronization can be achieved between the information processing device and the content data recording/reproducing device without having to depend upon the information processing device to which the content data recording/reproducing device is connected.

In addition, the synchronization application program started up by the information processing device automatically transmits content data from the information processing device to the content data recording/reproducing device and thus, the user of the content data recording/reproducing device is able to synchronize the content data between the information processing device and the content data recording/reproducing device without having to perform any operation related to the content data transmission, as in the first synchronization method.

Furthermore, in the third content data synchronization method achieved in the embodiment of the present invention, any content data to be transmitted from the information processing device that cannot be reproduced at the content data recording/reproducing device, or first converted to data reproducible at the content data recording/reproducing device and are then transmitted. In other words, since the dependency on the reproducibility of data at the content data recording/reproducing device is reduced in the third content data synchronization method, the level of content data synchronization between the information processing device and the content data recording/reproducing device can be improved (i.e., the content data synchronization can be achieved with a higher level of rigor).

(Variation of the Third Synchronization Method)

While a decision is made in step S314 in FIG. 9B for each set of content data set for transmission as to whether or not the content data can be reproduced at the content data recording/reproducing device 150, a decision on a factor other than the data reproducibility may be made in step S314. For instance, in the content data synchronization method achieved in the embodiment of the present invention, a decision may be made in a step (step S314') corresponding to step S314 as to whether or not a set of content data set for transmission contains any character code that cannot be properly displayed at the content data recording/reproducing device 150. If it is decided in step S314' that the content data contain a character code that cannot be properly displayed, the character code may be converted in a step (step S316'), corresponding to step S316 in FIG. 9B, in the content data synchronization method achieved in the embodiment of the present invention.

As a decision is made in step S314' as to whether or not the content data contain a character code that cannot be displayed properly and any problematic character code is converted in step S316', additional information such as the filename of the content data, additional information indicating the tune title, the artist name, the title of the album containing the content data and the like, included in the meta information, and the like can be displayed properly at the content data recording/reproducing device 150. It goes without saying that the content data synchronization method achieved in the embodiment of the present invention allows "decision-making as to whether or not the transmission target content data can be reproduced at the content data recording/reproducing device 150" and "decision-making as to whether or not the transmission target content data contain a character code that cannot be displayed properly at the content data recording/reproducing device 150" to be executed in conjunction with each other.

(Fourth Synchronization Method)

In the second synchronization method achieved in the embodiment of the present invention having been explained in reference to FIGS. 7A and 7B, a specific data area, to be designated as the content data transmission source, can be set/adjusted, whereas the third synchronization method achieved in the embodiment of the present invention having been explained in reference to FIGS. 9A and 9B ensures that any content data that cannot be reproduced at the content data recording/reproducing device are first converted to data in a reproducible format before they are transmitted. The second synchronization method and the third synchronization method may be adopted in combination.

(Fifth Synchronization Method)

In the first synchronization method achieved in the embodiment of the present invention having been explained in reference to FIG. 3, if the total volume of the content data stored in the specific data area at the information processing device 100 is greater than the available storage capacity at the content data recording/reproducing device 150, no content data are transmitted. However, even under such circumstances, synchronization between the information processing device 100 and the content data recording/reproducing device 150 can be achieved for part of the content data among the sets of content data stored in the specific data area of the information processing device 100. Accordingly, an explanation is provided below on the fifth synchronization method achieved in the embodiment of the present invention, whereby even when the total volume of the content data stored in the specific data area at the information processing device 100 is greater than the available storage capacity at the content data recording/reproducing device 150, the maximum extent of content data synchronization that is possible under the circumstances is achieved between the information processing device and the content data recording/reproducing device.

FIG. 10 presents a flowchart of the processing executed by adopting the fifth content data synchronization method achieved in the embodiment of the present invention.

First, the content data recording/reproducing device 150 and the information processing device 100 become connected with each other (S400). They may be connected at this time through a physical connection such as a USB connection through wireless connection such as a WUSB connection, as in the first synchronization method in the embodiment of the present invention described earlier.

After the content data recording/reproducing device 150 and the information processing device 100 become connected with each other in step S400, the information processing device 100 reads out the synchronization application program stored in the content data recording/reproducing device 150 and starts up the synchronization application program thus read out (S402). The information processing device 100 starts up the synchronization application program stored in the content data recording/reproducing device 150 through, for instance, its AutoRun function, and thus, the need for the user to install the synchronization application program in the information processing device 100 is eliminated as in the first synchronization method in the embodiment of the present invention described above. It is to be noted that the steps described below in reference to FIG. 10 are executed by the synchronization application program read out from the content data recording/reproducing device 150 and are started up and executed by the information processing device 100.

The synchronization application program having been started up by the information processing device 100 in step S402 then transmits to the content data recording/reproducing device 150 the content data stored in the specific data area at the information processing device 100 based upon their priority level settings (S404). At this time, a progress indication frame 122 such as that shown in FIG. 6 may be brought up on display as in the first synchronization method in the embodiment of the present invention explained earlier.

The priority levels mentioned above may be set based upon criteria (1)~(8) described below. It is to be noted that the following criteria are used in conjunction with audio content data.

(1) Content Data with More Recent Update Dates

A content data update date may be obtained based upon, for instance, update import information contained in the meta-information set in the content data. The term "meta-information" in this context is used to refer to information related to the content data to which it is appended.

(2) Genres and Artist Names with Preset Priority Rankings

Priority rankings may be set in advance in, for instance, a setting file in correspondence to genres and artist names and, in such a case, the synchronization application program is able to obtain the genres and artists names with preset priority rankings by reading out the setting file. It is to be noted that the setting file may be stored in the content data recording/reproducing device 150 together with the synchronization application program or it may be stored in the information processing device 100. In addition, it will be obvious that the contents of the setting file can be updated by either the information processing device 100 or the content data recording/reproducing device 150, or by both of them.

(3) Genres, Artist Names, Album Titles and Tune Titles of Content Data Having been Reproduced Often at the Information Processing Device 100

The number of times a specific tune has been reproduced can be ascertained by, for instance, reproduction frequency information contained in the meta-information set in the content data. In addition, the number of times tunes in a given genre, tunes performed by a given artist or tunes in a given album have been reproduced can be ascertained by averaging the numbers of reproductions based upon corresponding information among various types of information including the genre information, the artist name information, the album title information and the reproduction frequency information, contained in the meta-information set in the content data.

(4) Genres, Artist Names, Album Titles and Tune Titles Rated High in the Information Processing Device 100

The rating awarded to a given tune can be ascertained based upon the rating information contained in the meta-information set in the content data. In addition, the rating awarded to a given genre, a given artist or a given album can be ascertained by averaging the ratings based upon corresponding information among various types of information including the genre information, the artist name information, the album title information and the rating information, contained in the meta-information set in the content data.

(5) Genres and Artist Names with Significant Numbers of Content Data Stored in the Information Processing Device 100

The number of sets of content data corresponding to a specific genre or a specific artist stored in the information processing device 100 can be ascertained by calculating the sum of the sets of content data with identical genre information or artist name information contained in the meta-information set in the content data.

(6) Genres, Artist Names, Album Titles and Tune Titles Having been Reproduced Often at the Content Data Recording/Reproducing Device 150

The number of times a specific tune has been reproduced can be ascertained by, for instance, reproduction frequency information contained in the meta-information set in the content data, or it may be ascertained by allowing the content data recording/reproducing device 150 to store a table having recorded therein the number of reproductions in correspondence to each set of content data and referencing this reproduction frequency table. In addition, the number of times tunes in a given genre, tunes performed by a given artist or tunes in a given album have been reproduced can be ascertained by averaging the numbers of reproductions based upon corresponding information among various types of information including the genre information, the artist name information, the album title information and the reproduction frequency information, contained in the meta-information set in the content data.

(7) Genres and Artist Names Rated High in the Content Data Recording/Reproducing Device 150

The rating awarded to a given genre or a given artist can be ascertained by averaging the ratings based upon corresponding information among various types of information including the genre information, the artist name information and the rating information, contained in the meta-information set in the content data.

(8) Genres and Artist Names with Significant Numbers of Content Data Stored in the Content Data Recording/Reproducing Device 150

The number of sets of content data corresponding to a specific genre or a specific artist stored in the information processing device 100 can be ascertained by calculating the sum of the sets of content data with identical genre information or artist name information contained in the meta-information set in the content data.

It is to be noted that the priority levels may be set by using criteria other than those described in (1)~(8) above. For instance, if equal priority levels have been set based upon any of the criteria (1)~(8) for a plurality of sets of content data, a higher priority level may be set for a set of content data with a greater volume. By transmitting content data based upon the priority levels as described above, content data synchronization between the information processing device 100 and the content data recording/reproducing device 150 can be achieved based upon the priority rankings desired by the user.

As the content data transmission from the information processing device 100 to the content data recording/reproducing device 150 starts in step S404, the synchronization application program makes a decision as to whether or not to halt the content data transmission before all the transmittable content data stored in the specific data area at the information processing device 100 are transmitted (S406). The decision as to whether or not to halt the transmission may be made in step S406 by deciding, for instance, whether or not an Abort button in the progress indication frame 122 in FIG. 6 has been touched, as in the first synchronization method achieved in the embodiment of the present invention explained earlier.

If it is decided in step S406 that the content data transmission is to be halted, the content data transmission is stopped thereby halting the content data transmission (S410). It is to be noted that while the content data synchronization processing executed to achieve content data synchronization between the information processing device 100 and the content data recording/reproducing device 150 ends as the content data transmission is stopped in step S406 in the example presented in FIG. 10, the present invention is not limited to this example and the content data transmission having been stopped may be allowed to resume instead, as explained earlier in reference to the first synchronization method achieved in the embodiment of the present invention.

If it is decided in step S406 that the content data transmission is not to be halted, the synchronization application program transmits the transmittable content data stored in the specific data area at the information processing device 100, based upon their priority levels by making a decision for each set of content data to be transmitted as to whether or not the volume of the content data is greater than the available storage capacity at the content data recording/reproducing device 150 (S408).

If it is decided in step S408 that the volume of a given set of transmission target content data is greater than the available storage capacity at the content data recording/reproducing device 150, the transmission of the particular content data is aborted and instead another set of content data among the content data yet to be transmitted, the volume of which is smaller than the available storage capacity at the content data recording/reproducing device 150, is transmitted to the content data recording/reproducing device 150 based upon the content data priority levels (S414). It is to be noted that if there is no content data among the sets of content data yet to be transmitted, the volume of which is smaller than the available storage capacity at the content data recording/reproducing device 150, no content data are transmitted in step S414.

If it is decided in step S408 that the volume of the transmission target content data is equal to or less than the available storage capacity at the content data recording/reproducing device 150, the content data are transmitted (S412).

As the transmission processing executed in step S412 or step S414 to transmit the content data is completed, a decision is made as to whether or not there are any content data that can be transmitted among the content data yet to be transmitted (S416). The "completion of the content data transmission" in this context may include the completion of processing executed to record the transmitted content data into the recording/reproducing device-side storage unit 154 at the content data recording/reproducing device 150.

If it is decided in step S416 that there are still content data that can be transmitted, the operation returns to step S404 to repeatedly execute the transmission processing.

If it is decided in step S416 that there are no more content data that can be transmitted, it is judged that the content data transmission has been completed and, accordingly, the content data synchronization processing for the information processing device 100 and the content data recording/reproducing device 150 ends (S418). In addition, once the content data synchronization processing ends, the information processing device 100 releases the synchronization application program having been read out from the content data recording/reproducing device 150.

As described above, the information processing device adopting the fifth content data synchronization method achieved in the embodiment of the present invention, reads out the synchronization application program stored in the content data recording/reproducing device and starts up the synchronization application program thus read out as the content data recording/reproducing device and the information processing device become connected with each other. In other words, the method does not require the user to install the synchronization application program in the information processing device. As a result, the content data synchronization can be achieved between the information processing device and the content data recording/reproducing device without having to depend upon the information processing device to which the content data recording/reproducing device is connected.

In addition, the synchronization application program started up by the information processing device automatically transmits content data from the information processing device to the content data recording/reproducing device and even when the total volume of the content data stored in the specific data area at the information processing device is greater than the available storage capacity at the content data recording/reproducing device, the maximum extent of content data synchronization is achieved between the information processing device and the content data recording/reproducing device.

(Sixth Synchronization Method)

The fifth synchronization method shown in FIG. 10 makes it possible to maximize synchronization of content data between the information processing device and the content data recording/reproducing device even when the total volume of the content data stored in the specific data area at the information processing device 100 is greater than the available storage capacity at the content data recording/reproducing device 150. The fifth synchronization method achieved in the embodiment of the present invention may be adopted in a mode other than that described above. For instance, the fifth synchronization method may be adopted in conjunction with the second synchronization method and/or the third synchronization method as well.

(Content Data Retransmission Prevention)

As has been described in reference to the first through sixth synchronization methods achieved in the embodiment of the present invention, content data synchronization is automatically achieved as the content data recording/reproducing device and the information processing device become connected with each other in the content data communication system in the embodiment of the present invention. This means that content data having been previously transmitted from the information processing device to the content data recording/reproducing device may be transmitted again when the content data recording/reproducing device and the information processing device become reconnected with each other subsequently. Accordingly, the method adopted in the embodiment of the present invention to prevent retransmission of content data is explained next.

FIG. 11 illustrates how retransmission of content data is prevented in the embodiment of the present invention.

As shown in FIG. 11(*a*), three sets of content data "AAA", "BBB" and "CCC" are currently stored in the storage unit 104 at the information processing device 100. As the information processing device 100 and the content data recording/reproducing device 150 become connected with each other, the synchronization application program stored in the content data recording/reproducing device 150 is started up to achieve content data synchronization. Thus, after the content data synchronization is completed, the three sets of content data "AAA", "BBB" and "CCC" are stored in the recording/reproducing device-side storage unit 154 at the content data recording/reproducing device 150.

Upon transmitting the content data from the information processing device 100 to the content data recording/reproducing device 150, the synchronization application program creates and keeps history data related to the transmitted content data, as shown in FIG. 11(*b*). The history data created in correspondence to transmitted content data may include information indicating an ID inherent to the particular information processing device, content-IDs each assigned to a specific set of content data and the transmission date/time. The inherent information processing device ID may be assigned based upon, for instance, a combination of the vendor ID assigned to the USB device and the product ID, or if the information processing device includes a communication unit, its MAC address (media access control address) may be assigned as the inherent ID. However, the inherent ID assigned to the information processing device is not limited to these examples. In addition, the history data related to the transmitted content data may be stored in the content data recording/reproducing device 150 or in the information processing device 100. If the history data for the transmitted content data are stored in the content data recording/reproducing device 150, the synchronization application program first checks the inherent ID of the information processing device 100 and then reads out the history data corresponding to the information processing device 100 from the content data recording/reproducing device 150. If, on the other hand, the history data for the transmitted content data are stored in the information processing device 100, the synchronization application program may make a decision as to whether or not there are any history data in the information processing device and then read out any history data that are present.

FIG. 11(c) shows that four sets of content data "AAA" "BBB", "CCC" and "DDD" are stored in the storage unit 104 at the information processing device 100 and that the recording/reproducing device-side storage unit 154 at the content data recording/reproducing device 150 stores two sets of content data "AAA and "CCC". Namely, the state shown in FIG. 11(c) differs from that in FIG. 11(a) in that another set of content data, i.e., "DDD" has been added in the storage unit 104 at the information processing device 100 and the content data "BBB" have been deleted from the recording/reproducing device-side storage unit 154 at the content data recording/reproducing device 150. It is to be noted that the content data "BBB" in the content data recording/reproducing device 150 may have been deleted by the user by operating the operation unit 158 or through any other deletion method. For instance, they may have been deleted in response to an operation performed at the information processing device 100 while the information processing device 100 and the content data recording/reproducing device 150 are in the connected state (e.g., the connected state shown in FIG. 11(a)).

As the information processing device 100 and the content data recording/reproducing device 150 become connected with each other in the state shown in FIG. 11(c) the synchronization application program stored in the content data recording/reproducing device 150 is started up to achieve content data synchronization. In the state shown in FIG. 11(c), there are two sets of content data "BBB" and "DDD" that are present in the storage unit 104 at the information processing device 100 but are not stored in the recording/reproducing device-side storage unit 154 at the content data recording/reproducing device 150. However, the synchronization application program reads out and references the history data shown in FIG. 11(b) and regards the content data "BBB" as transmitted content data. Thus, only the content data "DDD" are transmitted. As a result, the information processing device 100 and the content data recording/reproducing device 150 assume a post-synchronization state such as that shown in FIG. 11(d).

After the content data "DDD" are transmitted from the information processing device 100 to the content data recording/reproducing device 150, as shown in FIG. 11(d), history data corresponding to the content data "DDD" are added in the history data, as shown in FIG. 11 (e).

As shown in FIG. 11, in the content data retransmission prevention method achieved in the embodiment of the present invention, the transmitted content data are stored as history data to be referenced whenever establishing content data synchronization, so as to prevent retransmission of any content data having already been transmitted.

As explained above, as the content data recording/reproducing device and the information processing device become connected with each other in the content data communication system achieved in the first embodiment of the present invention, the information processing device reads out the synchronization application program stored in the content data recording/reproducing device and starts it up. In other words, the user is not required to install the synchronization application program in the information processing device. As a result, the content data synchronization can be achieved between the information processing device and the content data recording/reproducing device without having to depend upon the information processing device to which the content data recording/reproducing device is connected.

In addition, the synchronization application program started up by the information processing device automatically transmits content data from the information processing device to the content data recording/reproducing device and thus, the user of the content data recording/reproducing device is able to synchronize the content data between the information processing device and the content data recording/reproducing device without having to perform any operation related to the content data transmission.

Furthermore, while the content data communication system achieved in the first embodiment of the present invention described above includes as its structural component the information processing device 100, the first embodiment is not limited to this mode and may be adopted in conjunction with a computer such as a PC or a server. While the content data communication system achieved in the first embodiment of the present invention described above includes as its structural component the content data recording/reproducing device 150, the first embodiment is not limited to this mode and may be adopted in conjunction with a music•dynamic image recording/reproducing device such as a Walkman™, the trademark rights to which are held by the applicant of the present invention.

Second Embodiment

While synchronization is achieved for content data transmitted from the information processing device to the content data recording/reproducing device as the content data recording/reproducing device and the information processing device become connected with each other in the content data communication system achieved in the first embodiment of the present invention, content data may also be transmitted from the content data recording/reproducing device to the information processing device.

Accordingly, the content data communication system achieved in the second embodiment of the present invention, which allows content data to be transmitted from the content data recording/reproducing device to the information processing device, is explained next. It is to be noted that since the content data communication system in the second embodiment of the present invention adopts a structure similar to that of the content data communication system achieved in the first embodiment of the present invention, the following explanation focuses on the method adopted to transmit content data from the content data recording/reproducing device to the information processing device.

As in the content data communication system in the first embodiment of the present invention, history data for the transmitted content data, such as those shown in FIG. 11 (b), may be created in the content data communication system in the second embodiment of the present invention so as to transmit content data from the content data recording/reproducing device to the information processing device based upon the history data for the transmitted content data.

Alternatively, the content data transmission from the content data recording/reproducing device to the information processing device may be executed by the synchronization application program started up as the content data recording/reproducing device and the information processing device become connected with each other, by comparing the content data stored in the content data recording/reproducing device with the content data stored in a specific data area at the information processing device and transmitting content data representing the difference between the content data stored in the content data recording/reproducing device and the content data stored in the specific data area at the information processing device. While the content data comparison may be executed through hashing by comparing the hash values of the individual sets of content data, it will be obvious that the content data may be compared through a method other than hashing. As the synchronization application program compares the content data and transmits content data equivalent to the difference between the compared data, the accuracy of the content data synchronization between the information processing device and the content data recording/reproducing device is improved.

Furthermore, before content data transmission processing is executed in the content data communication system achieved in the second embodiment of the present invention to transmit content data from the content data recording/reproducing device to the information processing device, the synchronization application program may execute a verification so as to determine whether or not the content data recording/reproducing device and the information processing device in the connected state subscribe to a common subscription service. By imposing a specific restriction such as that described above with regard to the content data transmission from the content data recording/reproducing device to the information processing device, disorganized content data synchronization can be prevented. While the verification may be executed by, for instance, determining whether or not inherent key information with regard to an inherent key issued in correspondence to each subscription service is present at the information processing device, it may be executed by adopting a verification method other than this.

As explained above, as the content data recording/reproducing device and the information processing device become connected with each other in the content data communication system achieved in the second embodiment of the present invention, the information processing device reads out the synchronization application program stored in the content data recording/reproducing device and starts it up. In other words, the user is not required to install the synchronization application program in the information processing device, as in the content data communication system achieved in the first embodiment of the present invention. As a result, the content data synchronization can be achieved between the information processing device and the content data recording/reproducing device without having to depend upon the information processing device to which the content data recording/reproducing device is connected.

In addition, the synchronization application program started up by the information processing device automatically transmits content data from the information processing device to the content data recording/reproducing device and thus, the user of the content data recording/reproducing device is able to synchronize the content data between the information processing device and the content data recording/reproducing device without having to perform any operation related to the content data transmission.

Moreover, content data can be transmitted from the content data recording/reproducing device to the information processing device in the content data communication system achieved in the second embodiment of the present invention and thus, the accuracy of the content data synchronization achieved between the information processing device and the content data recording/reproducing device can be further improved over that assured in the content data communication system in the first embodiment of the present invention.

Third Embodiment

In the content data communication systems achieved in the first and second embodiments of the present invention, content data synchronization is achieved between an information processing device and a content data recording/reproducing device connected through a one-on-one connection. In the content data communication system in the third embodiment of the present invention to be described next, content data synchronization can be achieved between a plurality of information processing devices and a content data recording/reproducing device.

Figure 12:
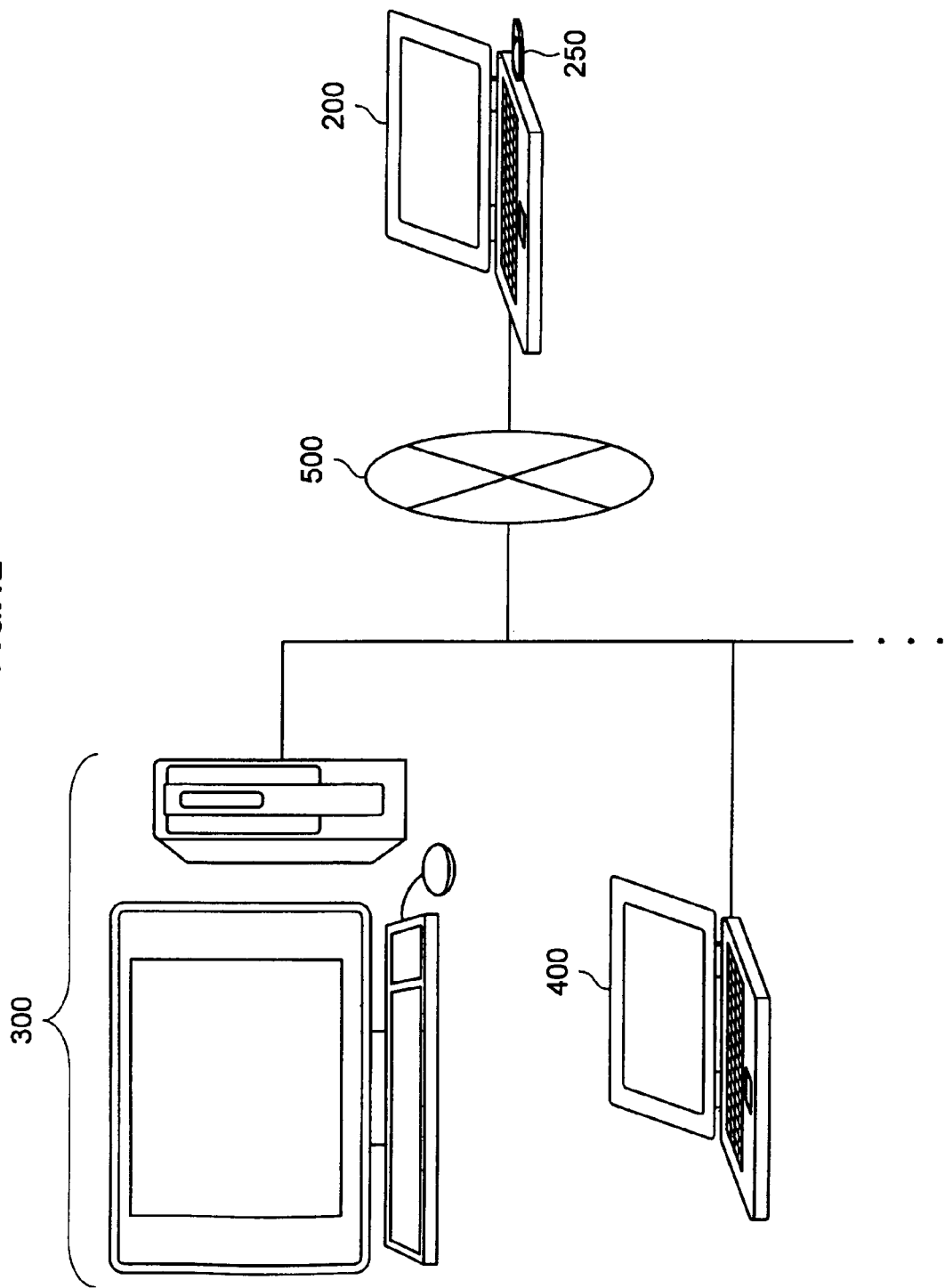
FIG. 12 schematically illustrates the content data communication system achieved in a third embodiment.

FIG. 12 schematically illustrates the configuration of the content data communication system achieved in the third embodiment of the present invention.

As shown in FIG. 12, the content data communication system in the third embodiment of the present invention comprises an information processing device 200, a content data recording/reproducing device 250 and information processing devices 300, 400, . . . connected with the information processing device 200 via a network 500. As the information processing device 200 and the content data recording/reproducing device 250 become connected with each other in the content data communication system in the third embodiment of the present invention, content data are transmitted from, for instance, the information processing device 300 to the content data recording/reproducing device 250 or from both the information processing devices 300 and 400 to the content data recording/reproducing device 250 via the network 500. The network 500 in this content data communication system may be a wired network such as a LAN (local area network) or a WAN (wide area network), a wireless network such as a WLAN (wireless local area network) operating in conjunction with a MIMO (multiple-input, multiple-output), the Internet adopting specific communication protocols such as the TCP/IP (transmission control protocol/Internet protocol) or any other type of network.

The following is a detailed explanation of the content data communication system achieved in the third embodiment of the present invention.

Figure 13:
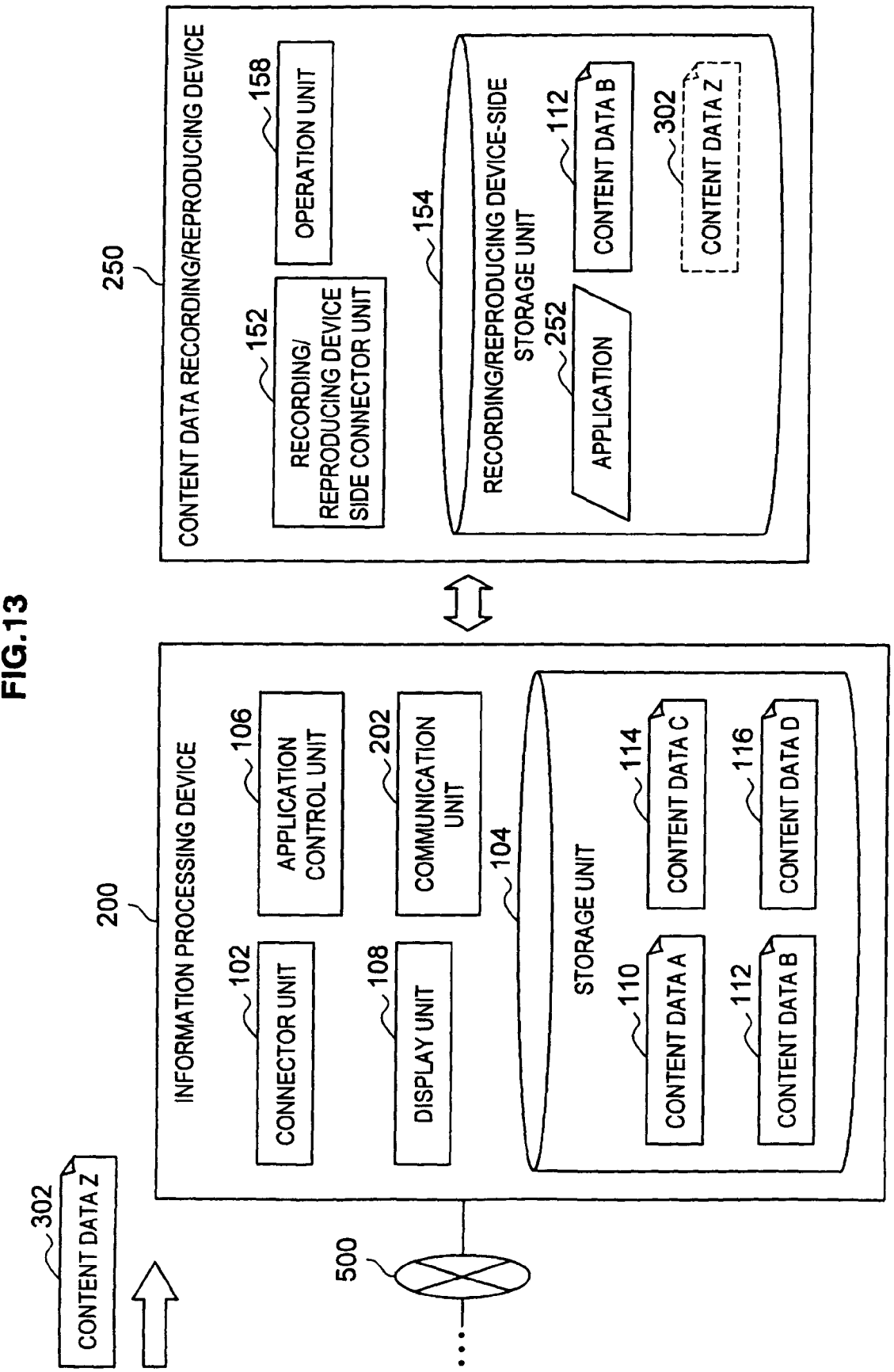
FIG. 13 is a block diagram of the content data communication system achieved in the third embodiment of the present invention.

FIG. 13 is a block diagram of the content data communication system achieved in the third embodiment of the present invention. As shown in FIG. 13, the information processing device 200 in the third embodiment of the present invention differs from the information processing device 100 in the first embodiment of the present invention shown in FIG. 2 in that it includes an additional unit, i.e., a communication unit 202 that is connected with the network 500 to engage in communication with external devices (e.g., the information processing devices 300, 400, . . . ). In addition, while the content data recording/reproducing device 250 in the third embodiment of the present invention assumes structural features and functions similar to those of the content data recording/reproducing device in the first embodiment of the present invention, it differs from the content data recording/reproducing device in the first embodiment in that its application program (synchronization application program) 252 stored in the recording/reproducing device-side storage unit 154 also controls a communication function through which communication with the external devices is carried out via the network 500.

As the information processing device 200 and the content data recording/reproducing device 250 become connected with each other, the application control unit 106 in the information processing device 200 reads out the synchronization application program stored in the content data recording/reproducing device 250 from the recording/reproducing device-side storage unit 154 at the content data recording/reproducing device 250 and starts it up, as in the content data communication systems achieved in the first and second embodiments.

The synchronization application program started up by the application control unit 106 connects with a specific external device via the communication unit 202 and achieves content data synchronization between the specific external device and the content data recording/reproducing device 250. In the example shown in FIG. 13, content data Z 302 have been transmitted from the external device via the network 500 and the transmitted content data Z 302 have been recorded in the recording/reproducing device-side storage unit 154 at the content data recording/reproducing device 250. It is to be noted that while the content data Z 302 having been transmitted from the external device via the network 500 are recorded in the content data recording/reproducing device 250 alone in the example shown in FIG. 13, the present invention is not limited to this example and the content data Z 302 having been transmitted from the external device may be recorded in both the information processing device 200 and the content data recording/reproducing device 250.

The specific external device may be an information processing device that matches an IP address (Internet protocol address) set in advance in the synchronization application program or it may be an information processing device matching an IP address set by the user. Furthermore, the specific external device may be an information processing device that offers a content data delivery service by adopting, for instance, the RSS (resource description framework side summary) system and the user wishing to subscribe to the service may set the service provider information management as the external device. It will be obvious that a plurality of specific external devices, e.g., an information processing device matching an IP address set in advance in the synchronization application program and an information processing device selected by the user, may be set.

For instance, as the user connects the content data recording/reproducing device 250 to the information processing device 200 installed in a public facility or a commercial facility (i.e., the information processing device 200 is not owned by the user), the user visiting the public facility or the commercial facility is able to achieve content data synchronization between the external device (information processing device) belonging to the user and the content data recording/reproducing device 250 in the content data communication system achieved in the third embodiment of the present invention. In this particular example of application, the information processing device 200 is not owned by the user, it is desirable, from the viewpoint of copyright management and the like, not to allow the content data to be synchronized to be stored in the information processing device 200 (i.e., it is desirable to adopt the mode shown in FIG. 13).

As explained above, as the content data recording/reproducing device and the information processing device become connected with each other in the content data communication system achieved in the third embodiment of the present invention, the information processing device reads out the synchronization application program stored in the content data recording/reproducing device and starts it up, as in the content data communication systems achieved in the first and second embodiments of the present invention. In other words, the user is not required to install the synchronization application program in the information processing device. As a result, the content data synchronization can be achieved between the specific external device and the content data recording/reproducing device without having to depend upon the information processing device to which the content data recording/reproducing device is connected.

In addition, the synchronization application program started up by the information processing device connects with the specific external device via the communication unit at the information processing device and the network and automatically transmits content data from the specific external device to the content data recording/reproducing device. Thus, the user of the content data recording/reproducing device is able to synchronize the content data between the specific external device and the content data recording/reproducing device without having to perform any operation related to the content data transmission.

Furthermore, while the content data communication system achieved in the third embodiment of the present invention described above includes as its structural components the information processing devices 200, 300, 400, . . . , the third embodiment is not limited to this mode and may be adopted in conjunction with a computer such as a PC or a server or in conjunction with portable communication devices such as portable telephones and PHS units (personal handy-phone system unit). While the content data communication system achieved in the third embodiment of the present invention described above includes as its structural component the content data recording/reproducing device 250, the third embodiment is not limited to this mode and may be adopted in conjunction with a music dynamic image recording/reproducing device such as a Walkman™, the trademark rights to which are stored by the applicant of the present invention.

Fourth Embodiment

While content data synchronization is achieved in the content data communication system in the third embodiment of the present invention as the content data recording/reproducing device and the information processing device become connected with each other and content data are transmitted from the specific external device to the content data recording/reproducing device via the communication unit at the information processing device and the network, content data may also be transmitted from the content data recording/reproducing device to the specific external device. Accordingly, the content data communication system achieved in the fourth embodiment of the present invention, which allows content data to be transmitted from the content data recording/reproducing device to the specific external device, is explained next.

The content data communication system in the fourth embodiment of the present invention adopts a structure similar to that of the content data communication system achieved in the third embodiment of the present invention. In addition, as in the content data communication system achieved in the second embodiment of the present invention, content data transmission from the content data recording/reproducing device to the specific external device can be executed by checking the history data for the transmitted content data or by comparing content data through hashing.

As explained above, as the content data recording/reproducing device and the information processing device become connected with each other in the content data communication system achieved in the fourth embodiment of the present invention, the information processing device reads out the synchronization application program stored in the content data recording/reproducing device and starts it up, as in the content data communication system achieved in the first through third embodiments of the present invention. In other words, the user is not required to install the synchronization application program in the information processing device. As a result, the content data synchronization can be achieved between the specific external device and the content data recording/reproducing device without having to depend upon the information processing device to which the content data recording/reproducing device is connected.

In addition, the synchronization application program started up when the information processing device connects with the specific external device via the communication unit at the information processing device and the network and automatically transmits content data from the specific external device to the content data recording/reproducing device and thus, the user of the content data recording/reproducing device is able to synchronize the content data between the specific external device and the content data recording/reproducing device without having to perform any operation related to the content data transmission.

Moreover, the content data communication system in the fourth embodiment of the present invention allows content data to be transmitted from the content data recording/reproducing device to the specific external device as well. Thus, the user away from home may connect his content data recording/reproducing device to an information processing device installed at a facility he is visiting so as to achieve content data synchronization between the content data recording/reproducing device and his own information processing device (i.e., an external device to the information processing device installed at the facility). In other words, it assures an even higher level of flexibility with regard to content data synchronization than the content data communication systems achieved in the first through third embodiments of the present invention.

(Content Data Synchronization Program)

A content data communication system that allows content data to be synchronized between the content data recording/reproducing device and the information processing device or between the content data recording/reproducing device and a specific external device may be realized through the use of a program enabling computers to function as the content data recording/reproducing device and the information processing device in any of the first through fourth embodiments of the present invention described above. In addition, the program can be recorded into a computer-readable recording medium.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, while an explanation is given above in reference to the first and second embodiments on content data communication systems that allow content data to be synchronized between the information processing device and the content data recording/reproducing device without having to rely on the information processing device connected with the content data recording/reproducing device and an explanation is given above in reference to the third and fourth embodiments on content data communication systems that allow content data to be synchronized between a specific external device and the content data recording/reproducing device without having to rely on the information processing device connected with the content data recording/reproducing device, the present invention is not limited to these examples and it may be adopted in a content data communication system that achieves content data synchronization between the information processing device and the content data recording/reproducing device and content data synchronization between a specific external device and the content data recording/reproducing device at the same time. An even higher level of flexibility is assured with regard to content data synchronization through such a content data communication system.

Moreover, in each of the content data communication systems achieved in the first through fourth embodiments of the present invention described above, the information processing device reads out the synchronization application program stored in the content data recording/reproducing device and content data synchronization is achieved by the synchronization application program thus read out. However, the present invention is not limited to this example and content data synchronization may be achieved in response to a specific operation performed by the user in relation to content data synchronization, e.g., a drag-and-drop operation, as in a system configured in conjunction with a content data recording/reproducing device in the related art.

In addition, while the content data recording/reproducing devices shown in FIGS. 1 and 13 each include its own built-in recording/reproducing device-side storage unit, the present invention is not limited to this example, and the recording/reproducing device-side storage unit may be a detachable storage unit that can be freely loaded into and unloaded from the content data recording/reproducing device. Furthermore, the sequence of the processing described above may also be executed by configuring the functional blocks in FIG. 2 or 13 in hardware.

The structures described above simply represent examples of embodiments of the present invention and are thus obviously within the technical scope of the present invention.

What is claimed is:

1. A content data communication system, comprising:
a content data recording/reproducing device and an information processing device, wherein:
said content data recording/reproducing device includes:
a recording/reproducing device-side connector unit that connects with said information processing device; and
a recording/reproducing device-side storage unit that stores an application program, and transmission of content data from said information processing device to said content data recording/reproducing device is controlled based upon the application program, and said information processing device includes:
a connector unit that connects with said content data recording/reproducing device;
a storage unit that stores content data; and
a control unit that reads out said application program stored in said recording/reproducing device-side storage unit as said content data recording/reproducing device becomes connected to said information processing device and engages said connector unit to transmit said content data stored in a specific data area in said storage unit to said recording/reproducing device-side storage unit based upon said application program having been read out, and said control unit disallows transmission of the content data via said connector unit when the available storage capacity at said recording/reproducing device-side storage unit is smaller than the total volume of the content data stored in the specific data area at said storage unit.

2. A content data communication system according to claim 1 wherein:
said control unit enables selective deletion of content data stored in said recording/reproducing device-side storage unit by bringing up a list of the content data stored in said recording/reproducing-side storage unit on display at a display unit when the content data are not to be transmitted.

33

3. A content data communication system according to claim 2, wherein:
said control unit engages said connector unit to transmit the content data once the available storage capacity at said recording/reproducing device-side storage unit becomes greater than the total volume of the content data stored in the specific data area at said storage unit.

4. A content data communication system according to claim 1, wherein:
if the available storage capacity at said recording/reproducing device-side storage unit is smaller than the total volume of the content data stored in the specific data area at said storage unit, said control unit engages said connector unit to transmit said content data stored in the specific data area at said storage unit based upon a specific rule.

5. A content data communication system according to claim 4, wherein:
said control unit transmits content data, the volume of which is smaller than the available storage capacity at said recording/reproducing device-side storage unit, if the available storage capacity at said recording/reproducing device-side storage unit is smaller than the volume of selected content data.

6. A content data communication system according to claim 4, wherein:
said control unit disallows transmission of content data selected as transmission data if the available storage capacity at said recording/reproducing device-side storage unit is smaller than the volume of the selected content data.

7. A content data communication system according to claim 1, wherein:
said control unit brings up information indicating that transmission of the content data is currently in progress on display at a display unit.

8. A content data communication system according to claim 1, wherein:
as said content data recording/reproducing device and said information processing device become connected to each other, said control unit engages said connector unit to automatically transmit said content data based upon said application program.

9. A content data communication system according to claim 1, wherein:
said control unit engages said storage unit to store transmission history of said content data having already been transmitted, makes a decision as to whether or not each set of content data stored in the specific data area at said storage unit has already been transmitted based upon said transmission history and engages said connector unit to transmit untransmitted content data to said recording/reproducing device-side storage unit.

10. A content data communication system according to claim 1, wherein:
said control unit makes a decision as to whether or not a specific data area is set in said storage unit as a transmission source of the content data, brings up information to be used to set the specific data area on display at a display unit if the specific area is judged not to be set and sets the specific data area based upon an operation input.

11. A content data communication system according to claim 10, wherein:
said control unit stores setting information indicating the specific data area having been set in said information processing device.

34

12. A content data communication system according to claim 11, wherein:
based upon a change instruction in response to which said setting information is to be altered said control unit brings up information to be used to set the specific data area on display at said display unit and changes the specific data area based upon an operation input.

13. A content data communication system according to claim 1, wherein:
said control unit engages said connector unit to transmit content data not protected by digital copyright among the content data stored in the specific data area in said storage unit.

14. A content data communication system according to claim 1, wherein:
said control unit converts the content data to data in a format that can be reproduced by said content data recording/reproducing device and then transmits the converted data to said recording/reproducing device-side storage unit if the content data stored in the specific data area at said storage unit assume a format that cannot be reproduced at said content data recording/reproducing device.

15. A content data communication system according to claim 1, wherein:
said control unit automatically changes an identification name assigned to transmission content data if data bearing an identification name identical to the identification name of the transmission target content data are stored in said recording/reproducing device-side storage unit.

16. A content data communication system according to claim 1, wherein:
said content data recording/reproducing device further includes:
an operation unit; and
a control unit that deletes content data stored in said recording/reproducing device-side storage unit based upon operation input to said operation unit.

17. A content data communication system according to claim 1, wherein:
said control unit converts character code data used in transmission target content data to a specific character code if character code compatible with said content data recording/reproducing device if the character code data do not assume the specific character code before transmitting the transmission target content data to said content data recording/reproducing device-side storage unit via said connector unit.

18. A content data communication system according to claim 1, wherein:
said control unit engages said connector unit to transmit content data among the content data stored in said specific data area which are not stored in said recording/reproducing device-side storage unit from said storage unit to said recording/reproducing device-side storage unit.

19. The content data communication system according to claim 1, wherein the information processing device is a computer having a display unit, and the content data recording/reproducing device has a display unit and is configured to reproduce at least one of audio and video content.

20. A content data recording/reproducing device, comprising:
a connector unit that connects with an information processing device; and
a recording/reproducing device-side storage unit that stores a program that is read out by said information processing device as said content data recording/reproducing device becomes connected with said information processing device to enable said information processing device to execute transmission processing to transmit content data stored in a specific data area in a storage unit of said information processing device to said content data recording/reproducing device, wherein said content data recording/reproducing device does not receive the content data via said connector unit when the available storage capacity at said recording/reproducing device-side storage unit is smaller than the total volume of the content data stored in the specific data area at said storage unit.

21. A method to be adopted in data communication between a content data recording/reproducing device and an information processing device, comprising:
- a connecting step in which said content data recording/reproducing device and said information processing device become connected with each other;
- a reading step in which said information processing device reads out an application program stored at said content data recording/reproducing device and used to control content data transmission from said information processing device to said content data recording/reproducing device upon establishing a connection through said connecting step; and
- a transmission step in which content data stored in a specific data area at a storage unit of said information processing device are transmitted to a recording/reproducing device-side storage unit of said content data recording/reproducing device based upon said application program having been read out, and said information processing device disallows transmission of the content data when the available storage capacity at said recording/reproducing device-side storage unit is smaller than the total volume of the content data stored in the specific data area at said storage unit.

22. A data communication method to be adopted in data communication between a content data recording/reproducing device and an information processing device capable of carrying out communication with an external apparatus, comprising:
- a connecting step in which said content data recording/reproducing device and said information processing device become connected with each other;
- a reading step in which said information processing device reads out an application program stored at said content data recording/reproducing device and used to control content data transmission from said information processing device to said content data recording/reproducing device upon establishing a connection through said connecting step; and
- a transmission step in which content data stored in said external apparatus are received at a communication unit via said information processing device and the received content data are then transmitted to a recording/reproducing device-side storage unit of said content data recording/reproducing device based upon said application program having been read out, and said information processing device disallows transmission of the content data when the available storage capacity at said content data recording/reproducing device is smaller than the total volume of the content data.

23. A computer-readable recording medium having recorded therein a computer-executable program to be loaded into a content data recording/reproducing device, wherein:
- said program enables said information processing device to execute;
- read processing for reading out said program when said content data recording/reproducing device and said information processing device become connected with each other; and
- transmission processing for transmitting content data stored in a specific data area at a storage unit of said information processing device to a recording/reproducing device-side storage unit of said content data recording/reproducing device, and
- said disallowing transmission of the content data when the available storage capacity at said recording/reproducing device-side storage unit is smaller than the total volume of the content data stored in the specific data area at said storage unit.

* * * * *